(12) United States Patent
Takemoto et al.

(10) Patent No.: US 8,755,126 B2
(45) Date of Patent: Jun. 17, 2014

(54) ZOOM LENS AND IMAGE PICKUP APPARATUS INCLUDING THE SAME

(75) Inventors: Shoichi Takemoto, Utsunomiya (JP); Tomoyuki Nakamura, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 61 days.

(21) Appl. No.: 13/446,071

(22) Filed: Apr. 13, 2012

(65) Prior Publication Data

US 2012/0262798 A1 Oct. 18, 2012

(30) Foreign Application Priority Data

Apr. 15, 2011 (JP) .................................. 2011-090964

(51) Int. Cl.
*G02B 15/14* (2006.01)

(52) U.S. Cl.
USPC ............................. 359/695; 359/685; 359/676

(58) Field of Classification Search
USPC .................................. 359/676, 695, 685, 688
See application file for complete search history.

(56) References Cited

U.S. PATENT DOCUMENTS

| | | | |
|---|---|---|---|
| 4,874,231 A | 10/1989 | Aono | |
| 5,917,658 A | 6/1999 | Yamanashi | |

FOREIGN PATENT DOCUMENTS

| | | | |
|---|---|---|---|
| JP | 1126614 A | 5/1989 | |
| JP | 8234105 A | 9/1996 | |
| JP | 2005309061 A | 11/2005 | |
| JP | 2009128491 A | 6/2009 | |

*Primary Examiner* — Alicia M Harrington
(74) *Attorney, Agent, or Firm* — Rossi, Kimms & McDowell LLP

(57) ABSTRACT

A zoom lens includes a first lens unit, a second lens unit, a third lens unit, a fourth lens unit and a fifth lens unit. In the zoom lens, air intervals L2$w$, L3$w$ between the second lens unit and the third lens unit and between the third lens unit and the fourth lens unit at a wide-angle end, a focal length f1 of the first lens unit, a combined focal length f23$w$ of the second lens unit and the third lens unit at the wide-angle end, a focal length fw of the whole system at the wide-angle end, a zoom ratio Z, and a smallest value L2$z$1$a$ of the air interval between the second lens unit and the third lens unit in a wide angle zoom range in which a magnification-varying ratio relative to that at the wide-angle end ranges from $Z^{0.02}$ to $Z^{0.35}$ are appropriately set.

8 Claims, 14 Drawing Sheets

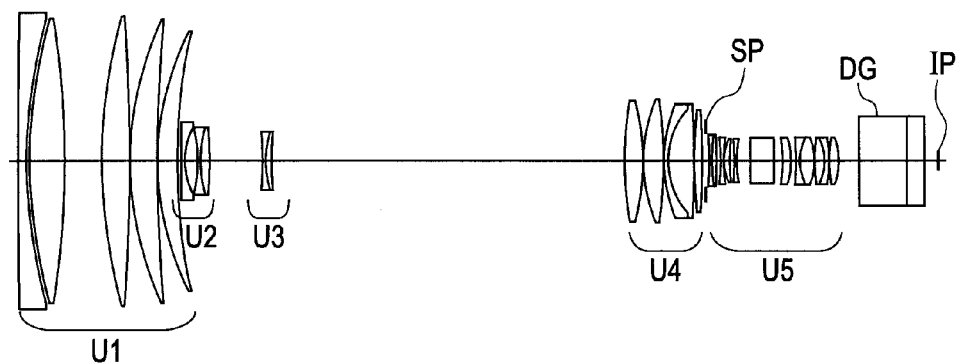
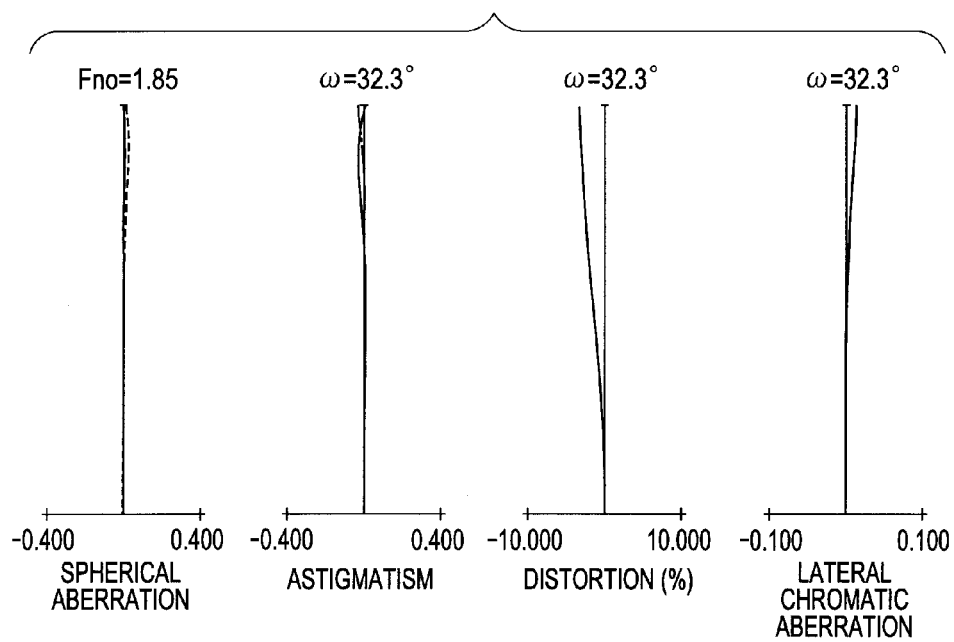

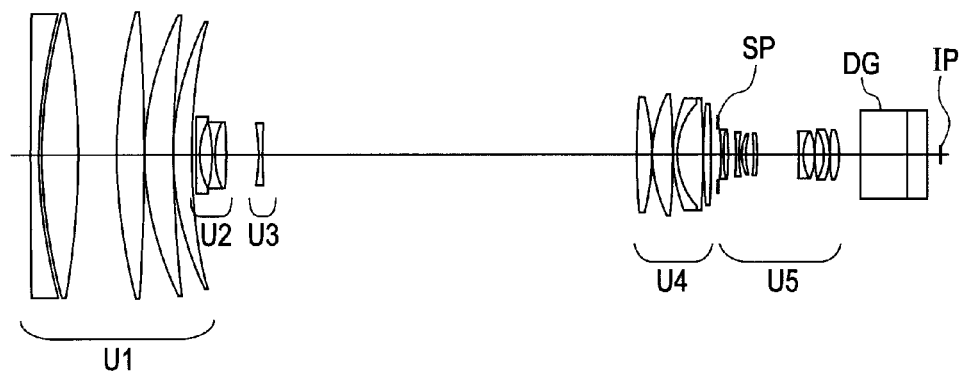
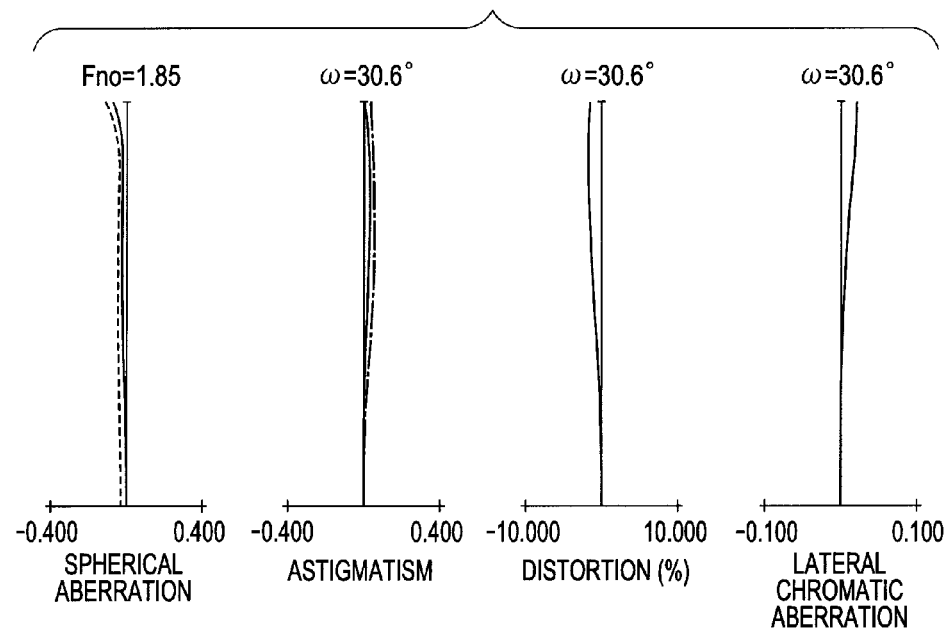

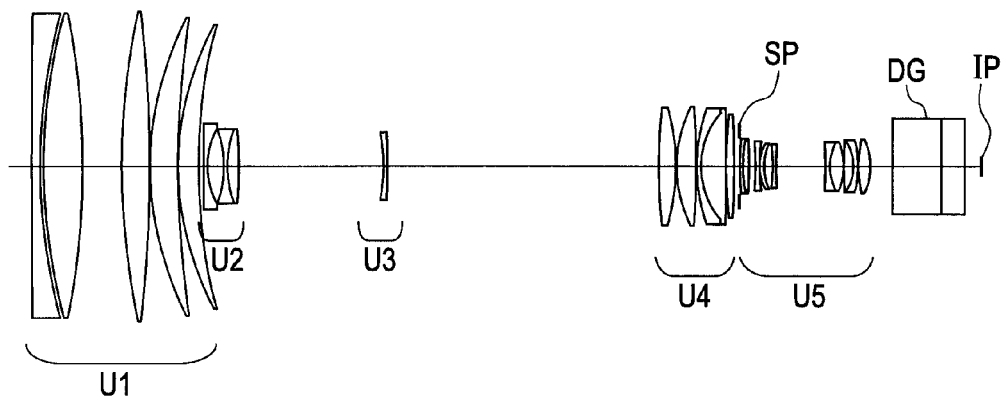
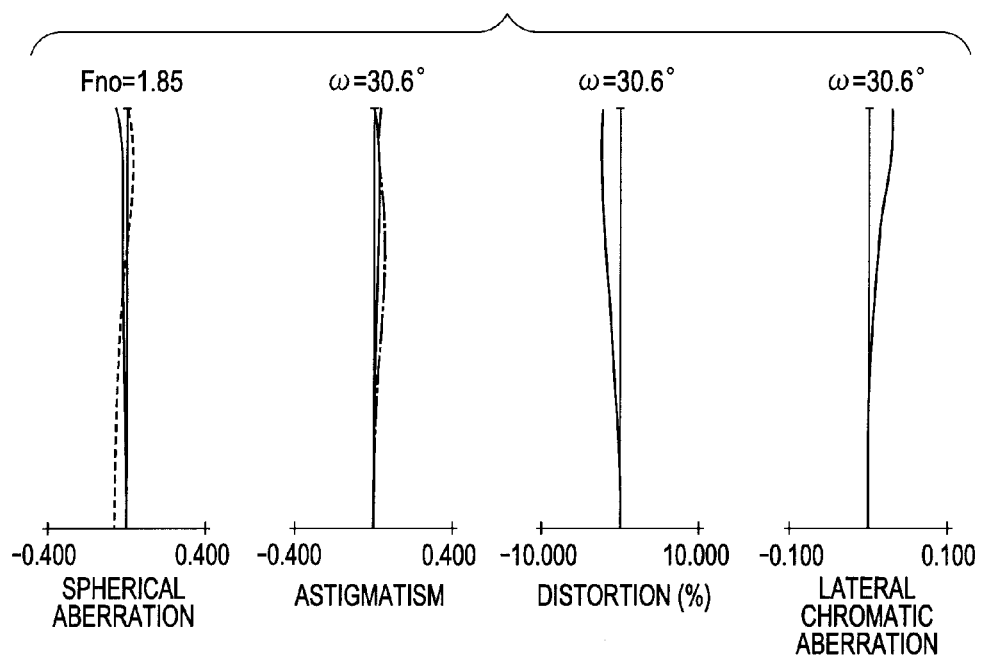

ZOOM LENS AND IMAGE PICKUP APPARATUS INCLUDING THE SAME

BACKGROUND OF THE INVENTION

1. Field of the Invention

The present invention relates to a zoom lens and an image pickup apparatus including the same. The present invention is suitably applied to broadcast TV cameras, video cameras, digital still cameras, surveillance cameras and silver-halide film cameras.

2. Description of the Related Art

In recent years, there have been demands for zoom lenses having a wider angle of view, higher zoom ratio and high optical performance for use in image pickup apparatuses such as TV cameras, silver-halide film cameras, digital cameras and video cameras. As a type of zoom lens having a wide angle of view and high zoom ratio, there has been known a positive lead type five-unit zoom lens comprising five lens units including a lens unit having a positive refractive power disposed on the most object side. There is a known five-unit zoom lens of this positive lead type in which the magnification-varying lens units having functions of variator and compensator are constituted by three movable lens units, which move in loci different from each other (Japanese Patent Application Laid-Open No. H08-234105 and No. H01-126614).

The zoom lenses disclosed in Japanese Patent Application Laid-Open No. H08-234105 and No. H01-126614 are each composed of a first lens unit having a positive refractive power, a second lens unit having a negative refractive power, a third lens unit having a negative refractive power, a fourth lens unit having a positive refractive power and a fifth lens unit having a positive refractive power for imaging. These documents disclose zoom lenses in which the second, third and fourth lens units move during zooming. Japanese Patent Application Laid-Open No. H08-234105 discloses a five-unit zoom lens having a zoom ratio of approximately 2.5 and an angle of view of approximately 30 degrees at the wide-angle end of the zoom range. Japanese Patent Application Laid-Open No. H01-126614 discloses a five-unit zoom lens having a zoom ratio of approximately 5 and an angle of view of approximately 66 degrees at the wide-angle end of the zoom range.

In order for five-unit zoom lenses to achieve high optical performance while having a wider angle of view and higher zoom ratio, it is important that appropriate conditions on movement of the second, third and fourth lens units as magnification-varying lens units during zooming be set and that the first lens unit be designed to have an appropriate refractive power. In addition, it is important that the second and third lens units be designed to have an appropriate combined refractive power and that the locus of movement of the third lens unit during zooming from the wide-angle end to an intermediate focal length position be set appropriately. Inappropriate setting of the above-mentioned factors will lead to difficulties in achieving a zoom lens having high optical performance throughout the whole zoom range while having a wider angle of view and higher zoom ratio.

In the five-unit zoom lens disclosed in Japanese Patent Application Laid-Open No. H08-234105 and No. H01-126614, an increase in the zoom ratio tends to necessitate an increase in the amount of movement of the movable lens units and an increase in the total length of the zoom lens and to lead to an increase in the variation in aberrations with zooming.

SUMMARY OF THE INVENTION

An object of the present invention is to provide a zoom lens having a wide angle of view and high zoom ratio while preventing an increase in aberration variation with zooming and to provide an image pickup apparatus having such a zoom lens.

A zoom lens according to the present invention comprises, in order from an object side to an image side, a first lens unit having a positive refractive power that does not move for zooming, a second lens unit having a negative refractive power that moves during zooming, a third lens unit having a negative refractive power that moves during zooming, a fourth lens unit having a positive refractive power that moves during zooming, and a fifth lens unit having a positive refractive power that does not move for zooming, wherein the zoom lens satisfies the following conditional expressions, $$1.50 < L2w/L2z1a < 1600.00,$$

$$0.05 < L2w/L3w < 0.60, \text{ and}$$

$$-14.50 < f1/f23w < -10.00,$$

where $L2w$ denotes an air interval between the second lens unit and the third lens unit at a wide-angle end, $L3w$ denotes an air interval between the third lens unit and the fourth lens unit at the wide-angle end, $f1$ denotes a focal length of the first lens unit, $f23w$ denotes a combined focal length of the second lens unit and the third lens unit at the wide-angle end, $fw$ denotes a focal length of the whole system at the wide-angle end, $Z$ denotes an zoom ratio, and $L2z1a$ denotes an smallest value of the air interval between the second lens unit and the third lens unit in a wide angle zoom range in which a magnification-varying ratio to that at the wide-angle end ranges from $Z^{0.02}$ to $Z^{0.35}$.

Further features of the present invention will become apparent from the following description of exemplary embodiments with reference to the attached drawings.

BRIEF DESCRIPTION OF THE DRAWINGS

FIG. 1 is a cross sectional view of a zoom lens at a wide-angle end according to a first embodiment.

FIG. 2A is an aberration diagram at the wide-angle end according to the first embodiment.

FIG. 7 is a cross sectional view of a zoom lens at a wide-angle end according to a fourth embodiment.

FIG. 8A is an aberration diagram of the zoom lens at the wide-angle end according to the fourth embodiment.

FIG. 11 is a cross sectional view of the zoom lens at a wide-angle end according to a sixth embodiment.

FIG. 12A is an aberration diagram of the zoom lens at the wide-angle end according to the sixth embodiment.

DESCRIPTION OF THE EMBODIMENTS

Preferred embodiments of the present invention will now be described in detail in accordance with the accompanying drawings.

Figure 2B:
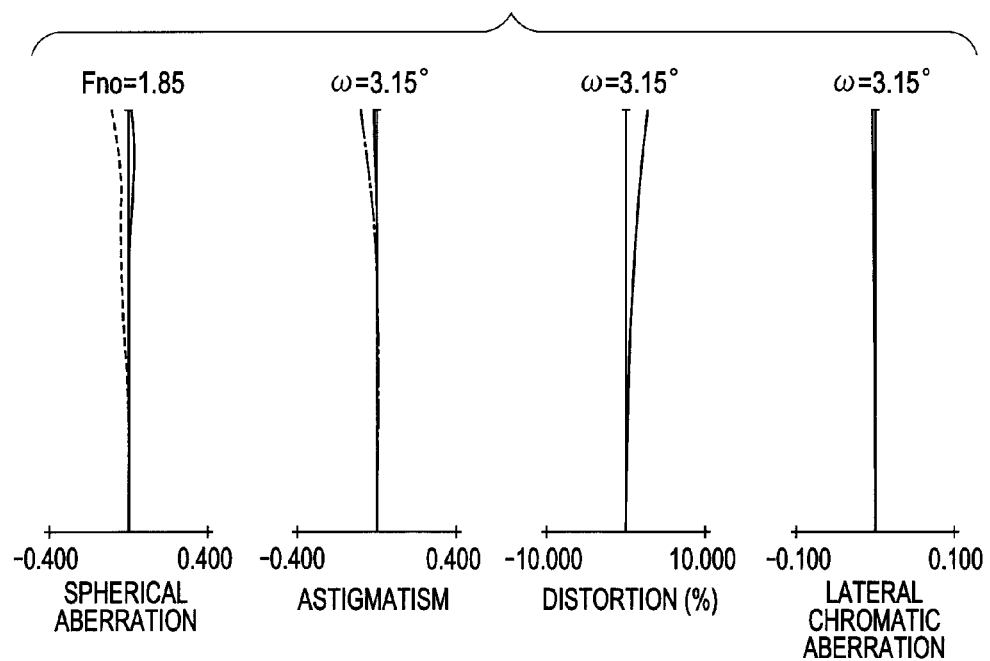
FIG. 2B is an aberration diagram at a focal length of 100 mm according to the first embodiment.
Figure 2C:
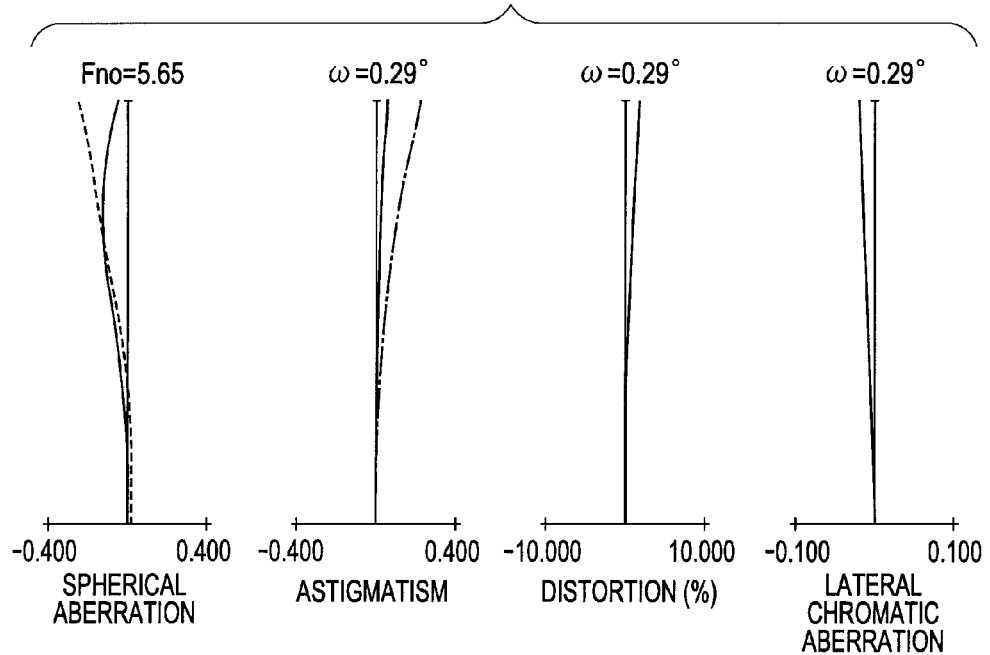
FIG. 2C is aberration diagram at a telephoto end according to the first embodiment.

A zoom lens according to the present invention includes, in order from an object side to an image side, a first lens unit having a positive refractive power that does not move for zooming, a second lens unit having a negative refractive power for magnification-varying, a third lens unit having a negative refractive power for magnification-varying, and a fourth lens unit having a positive refractive power for compensating image position variation due to zooming. The zoom lens according to the present invention further includes a fifth lens unit having a positive refractive power that does not move for zooming. FIG. 1 is a cross sectional view of a zoom lens according to Numerical Embodiment 1 as a first embodiment of the present invention in the state in which the zoom lens is focused on an object at infinity at a wide-angle end of the focal length range (i.e. at the shortest focal length). FIGS. 2A, 2B and 2C are longitudinal aberration diagrams of the zoom lens according to Numerical Embodiment 1 in the state in which the zoom lens is focused on an object at infinity respectively at the wide-angle end, at a focal length f of 100 mm and at a telephoto end of the focal length range (i.e. at the longest focal length).

Figure 3:
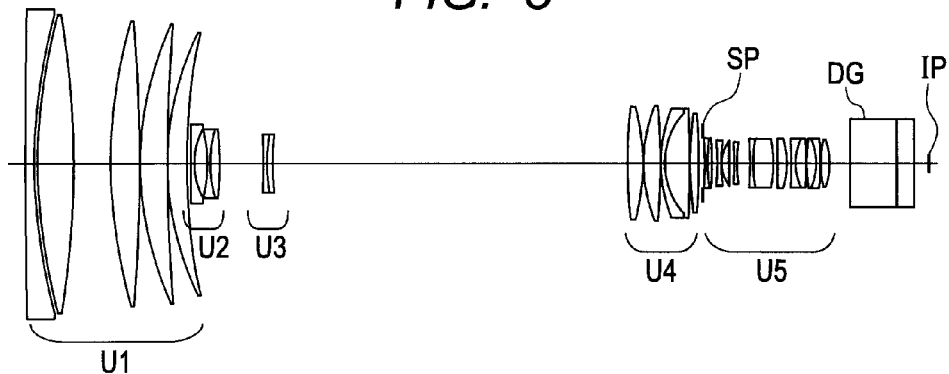
FIG. 3 is a cross sectional view of a zoom lens at a wide-angle end according to a second embodiment.
Figure 4A:
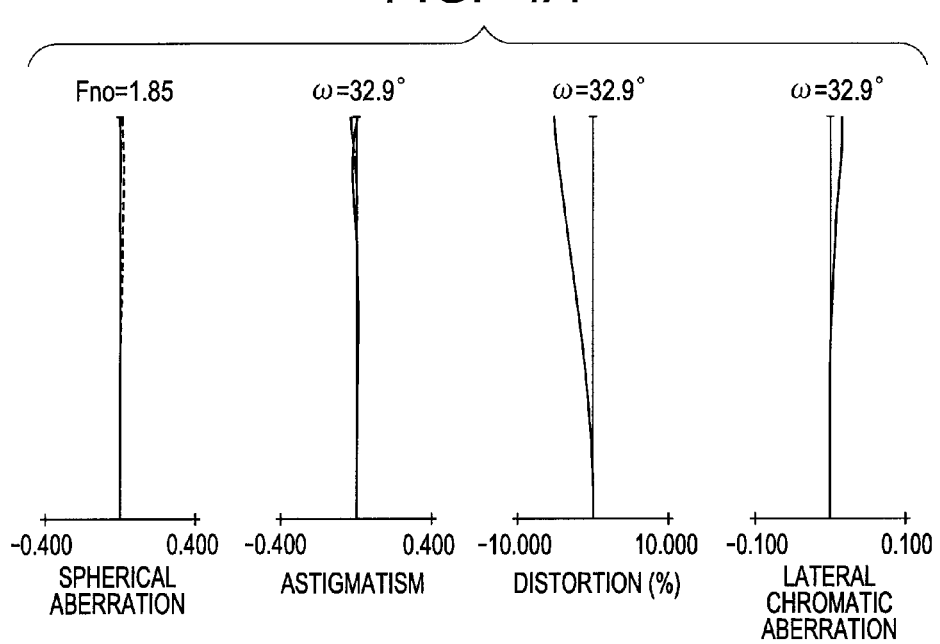
FIG. 4A is an aberration diagram at the wide-angle end according to the second embodiment.
Figure 4B:
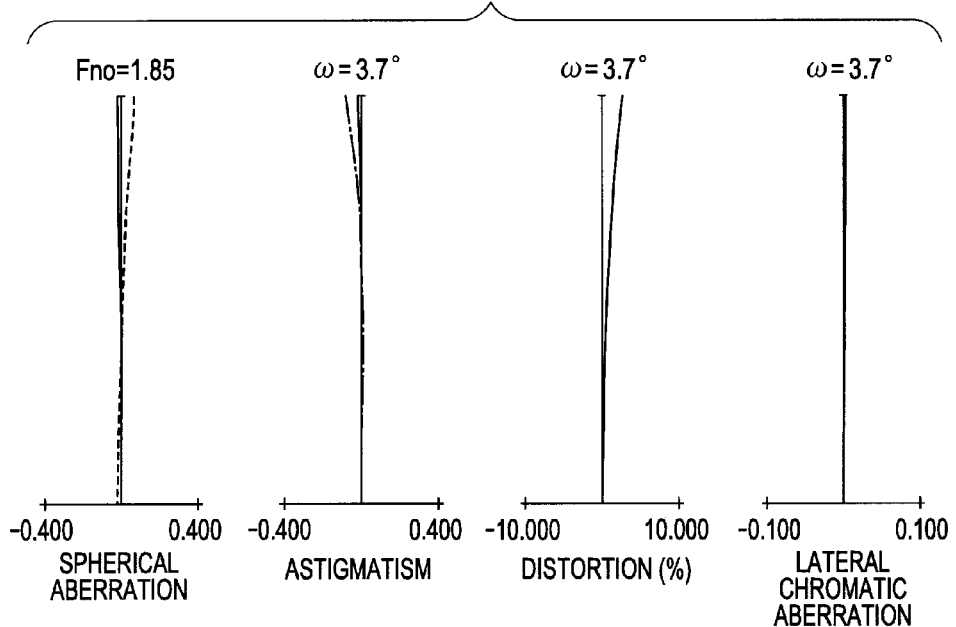
FIG. 4B is an aberration diagram at a focal length of 85 mm according to the second embodiment.
Figure 4C:
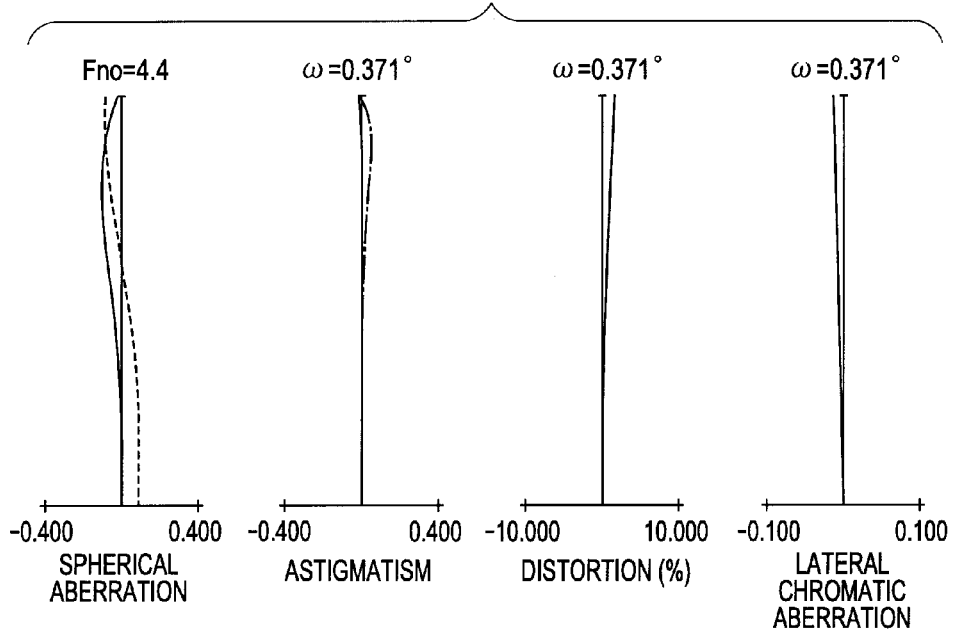
FIG. 4C is aberration diagram at a telephoto end according to the second embodiment.
Figure 5:
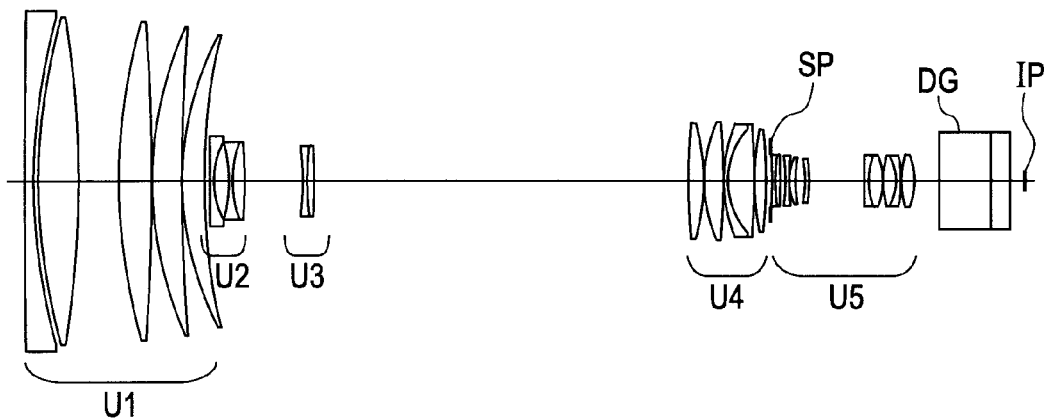
FIG. 5 is a cross sectional view of a zoom lens at a wide-angle end according to a third embodiment.
Figure 6A:
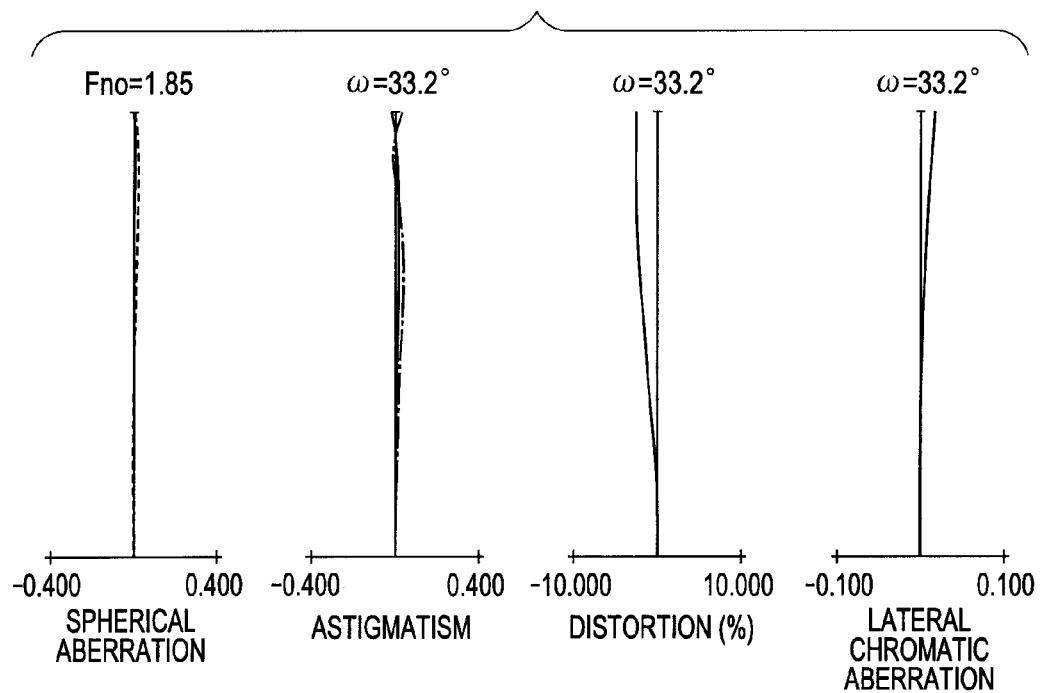
FIG. 6A is an aberration diagram at the wide-angle end according to the third embodiment.
Figure 6B:
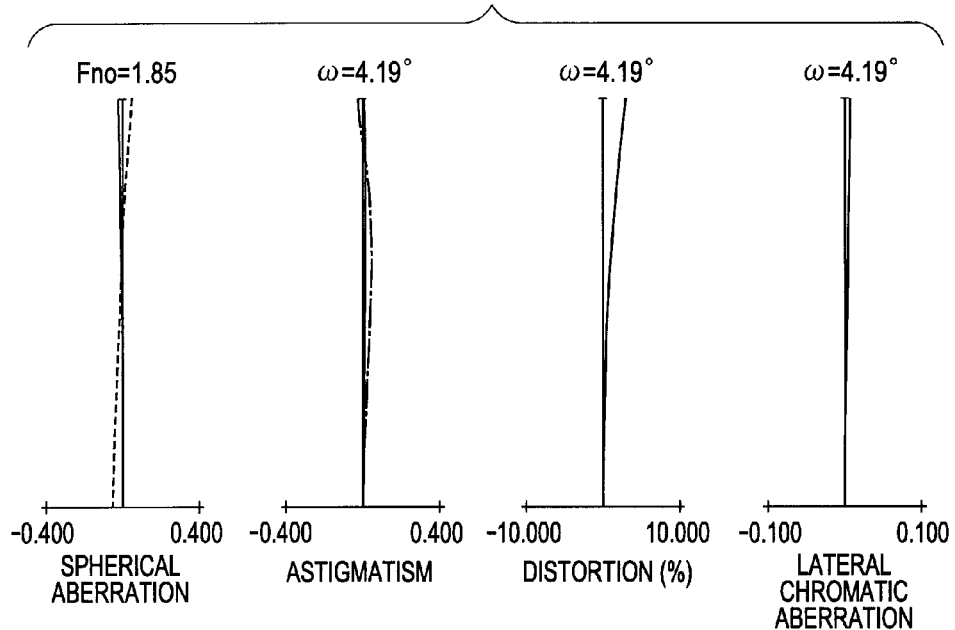
FIG. 6B is an aberration diagram at a focal length of 75 mm according to the third embodiment.
Figure 6C:
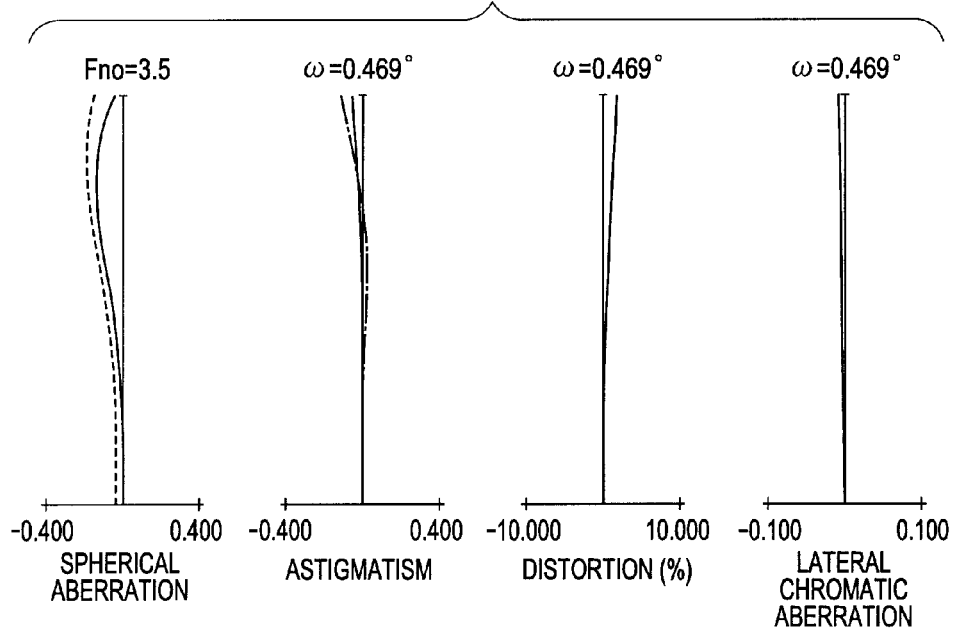
FIG. 6C is aberration diagram at a telephoto end according to the third embodiment.

FIG. 3 is a cross sectional view of a zoom lens according to Numerical Embodiment 2 as a second embodiment of the present invention in the state in which the zoom lens is focused on an object at infinity at a wide-angle end. FIGS. 4A, 4B and 4C are longitudinal aberration diagrams of the zoom lens according to Numerical Embodiment 2 in the state in which the zoom lens is focused on an object at infinity respectively at the wide-angle end, at a focal length f of 85 mm and at a telephoto end. FIG. 5 is a cross sectional view of a zoom lens according to Numerical Embodiment 3 as a third embodiment of the present invention in the state in which the zoom lens is focused on an object at infinity at a wide-angle end. FIGS. 6A, 6B and 6C are longitudinal aberration diagrams of the zoom lens according to Numerical Embodiment 3 in the state in which the zoom lens is focused on an object at infinity respectively at the wide-angle end, at a focal length f of 75 mm and at a telephoto end.

Figure 8B:
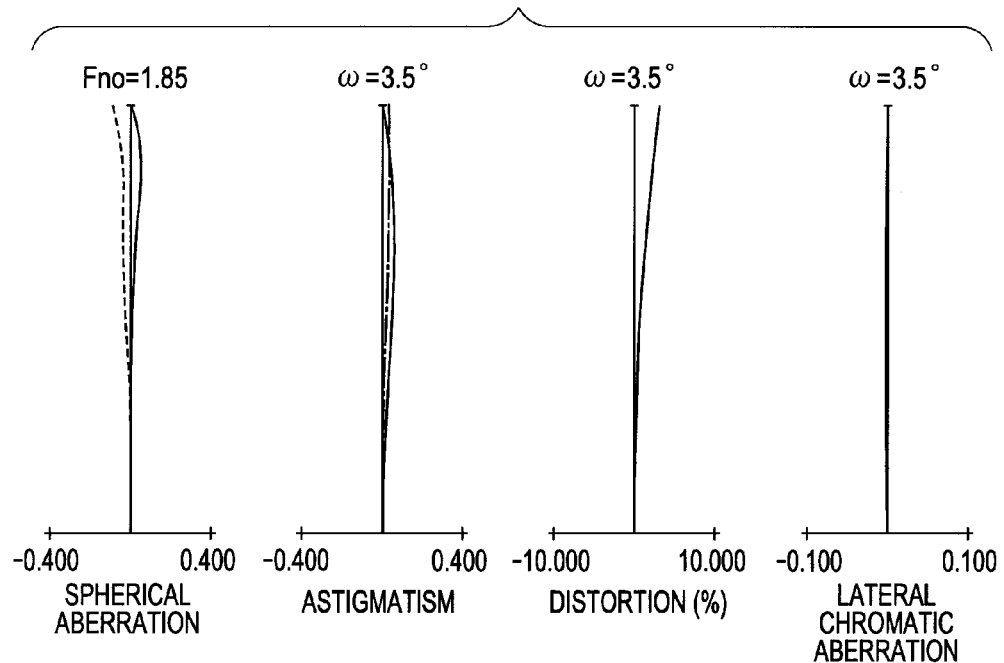
FIG. 8B is an aberration diagram at a focal length of 90 mm according to the fourth embodiment.
Figure 8C:
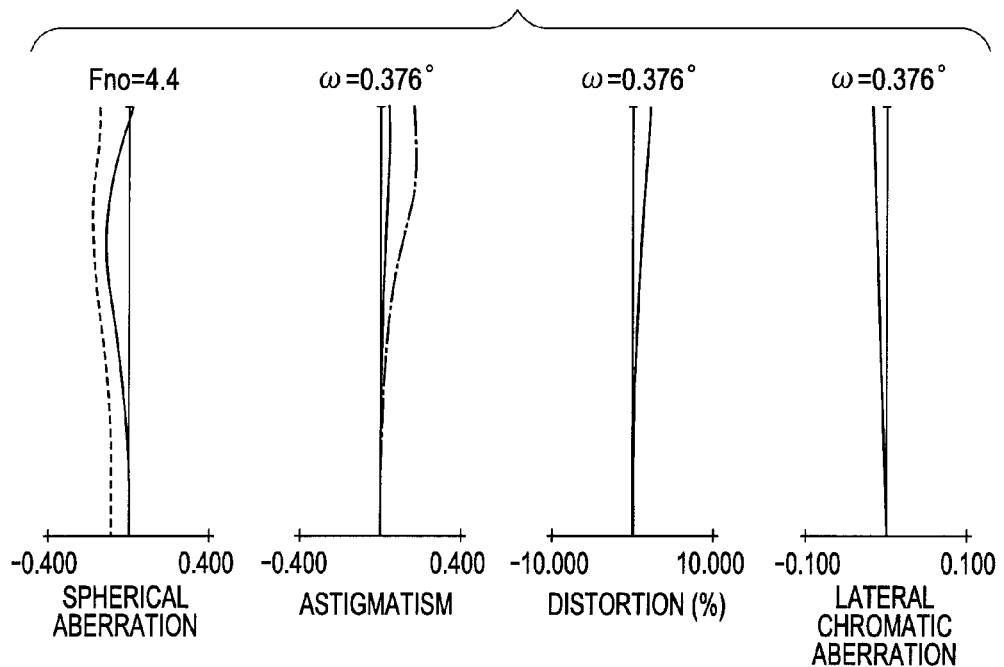
FIG. 8C is aberration diagram at a telephoto end according to the fourth embodiment.
Figure 9:
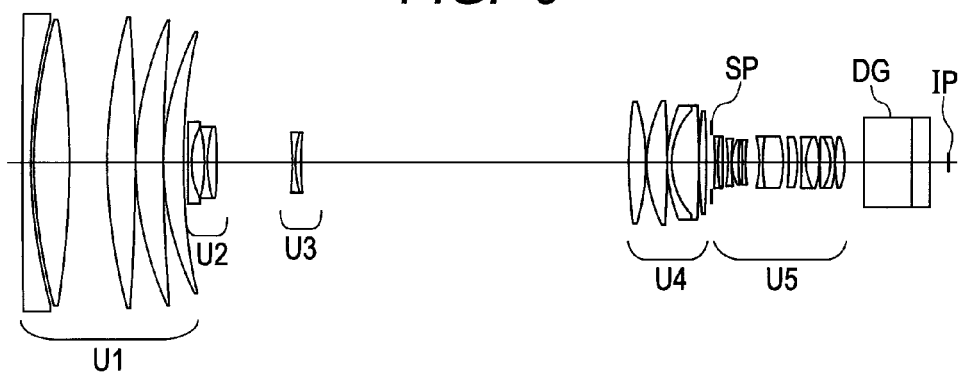
FIG. 9 is a cross sectional view of the zoom lens at a wide-angle end according to a fifth embodiment.
Figure 10A:
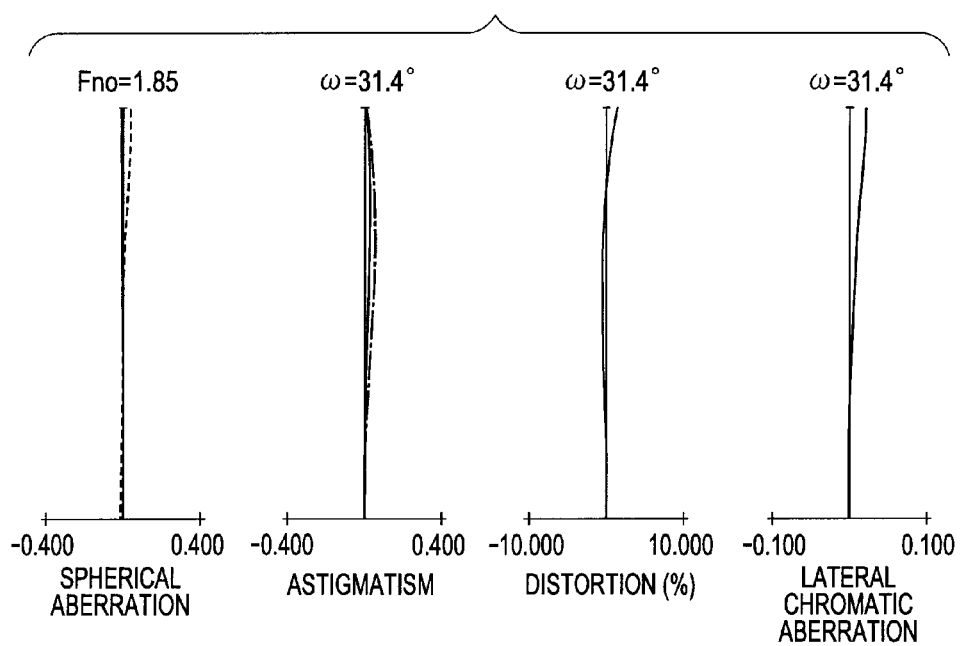
FIG. 10A is an aberration diagram at the wide-angle end according to the fifth embodiment.
Figure 10B:
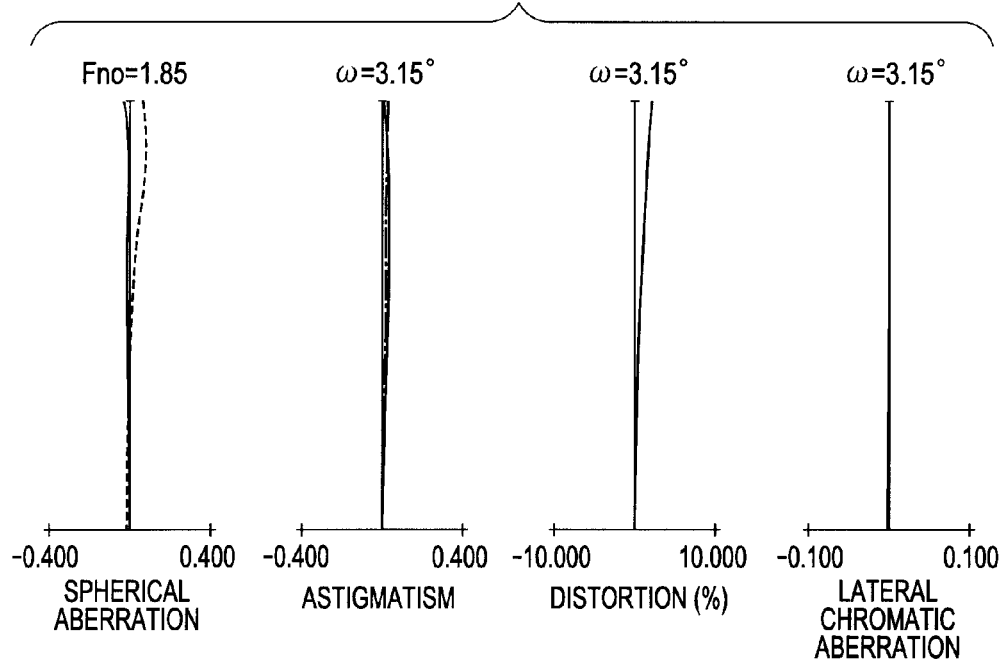
FIG. 10B is an aberration diagram at a focal length of 100 mm according to the fifth embodiment.
Figure 10C:
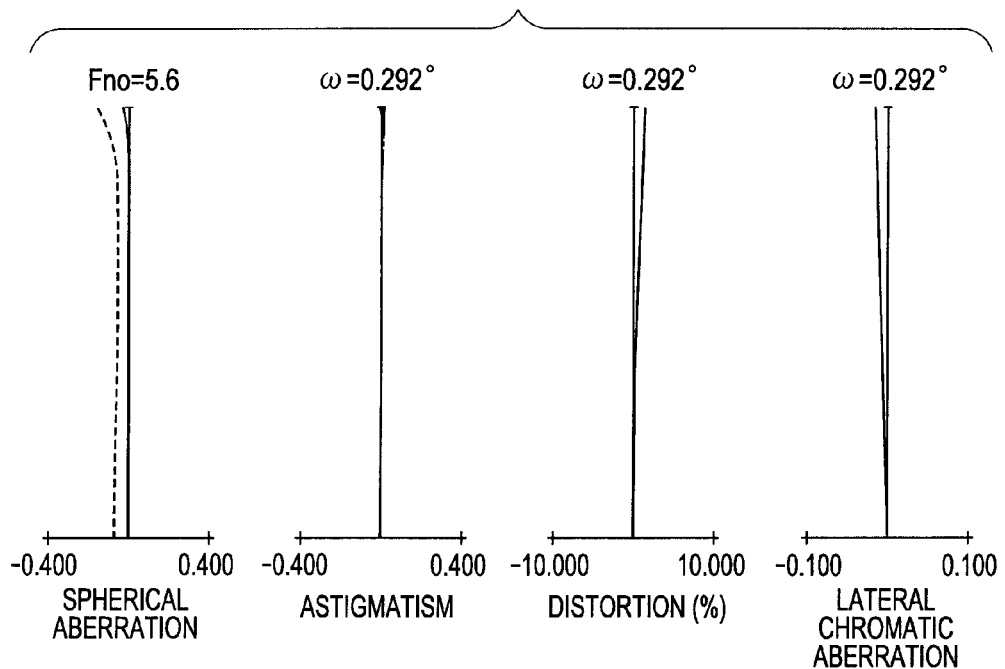
FIG. 10C is aberration diagram at a telephoto end according to the fifth embodiment.

FIG. 7 is a cross sectional view of a zoom lens according to Numerical Embodiment 4 as a fourth embodiment of the present invention in the state in which the zoom lens is focused on an object at infinity at a wide-angle end. FIGS. 8A, 8B and 8C are longitudinal aberration diagrams of the zoom lens according to Numerical Embodiment in the state in which the zoom lens is focused on an object at infinity respectively at the wide-angle end, at a focal length f of 90 mm and at a telephoto end. FIG. 9 is a cross sectional view of a zoom lens according to Numerical Embodiment 5 as a fifth embodiment of the present invention in the state in which the zoom lens is focused on an object at infinity at a wide-angle end. FIGS. 10A, 10B and 10C are longitudinal aberration diagrams of the zoom lens according to Numerical Embodiment 5 in the state in which the zoom lens is focused on an object at infinity respectively at the wide-angle end, at a focal length f of 100 mm and at a telephoto end.

Figure 12B:
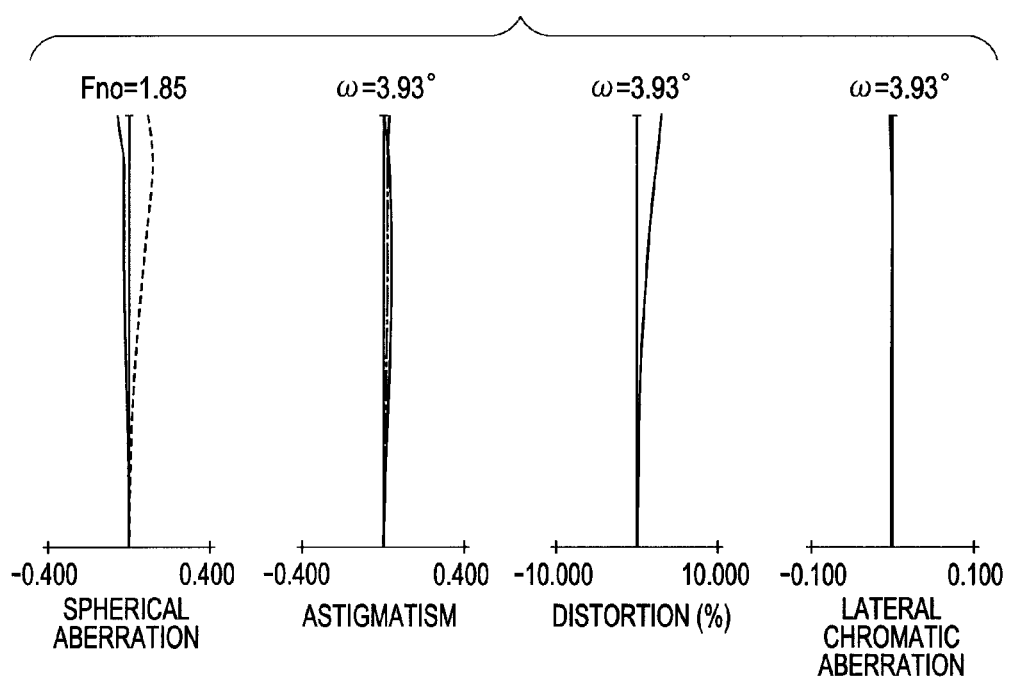
FIG. 12B is an aberration diagram of the zoom lens at a focal length of 80 mm according to the sixth embodiment.
Figure 12C:
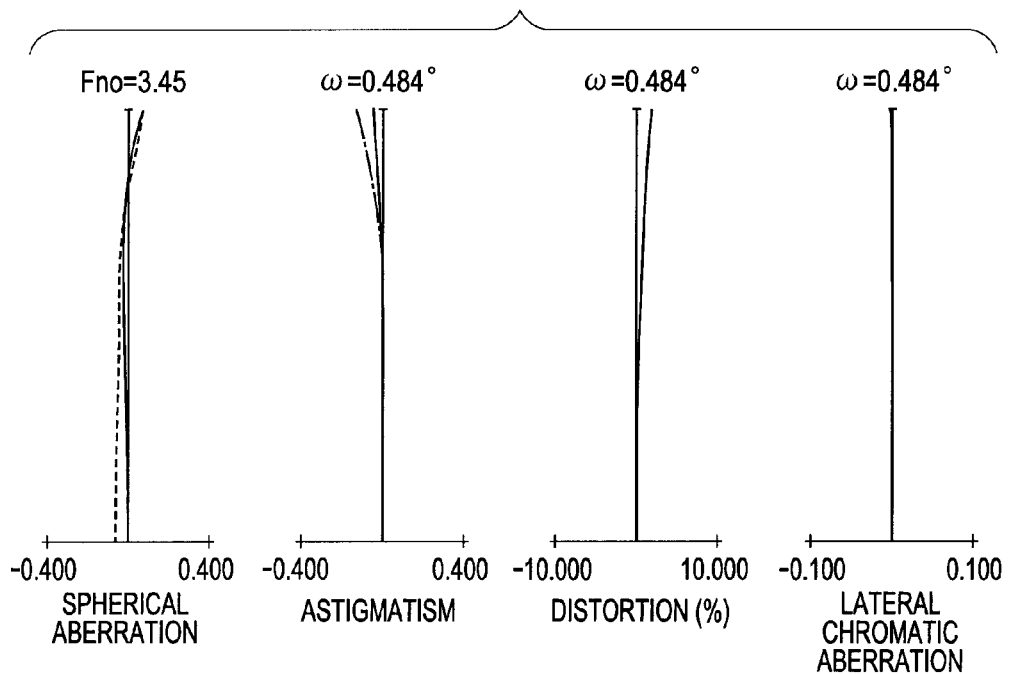
FIG. 12C is aberration diagram at a telephoto end according to the sixth embodiment.

FIG. 11 is a cross sectional view of a zoom lens according to a Numerical Embodiment 6 as a sixth embodiment of the present invention in the state in which the zoom lens is focused on an object at infinity at a wide-angle end. FIGS. 12A, 12B and 12C are longitudinal aberration diagrams of the zoom lens according to Numerical Embodiment 6 in the state in which the zoom lens is focused on an object at infinity respectively at the wide-angle end, at a focal length f of 80 mm and at a telephoto end.

Figure 13A:
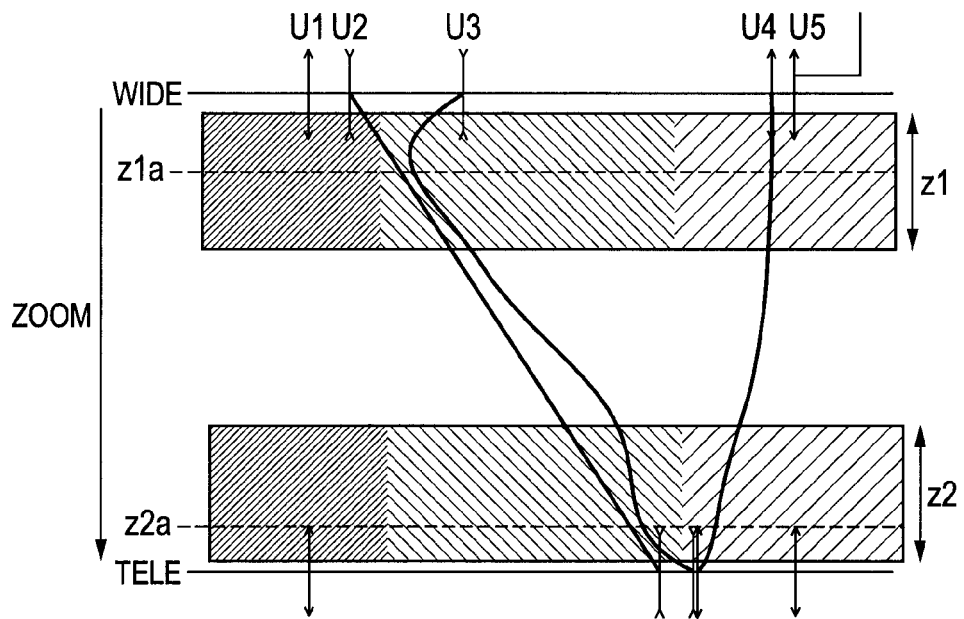
FIG. 13A is a schematic diagram of a zoom lens according to the present invention.
Figure 13B:
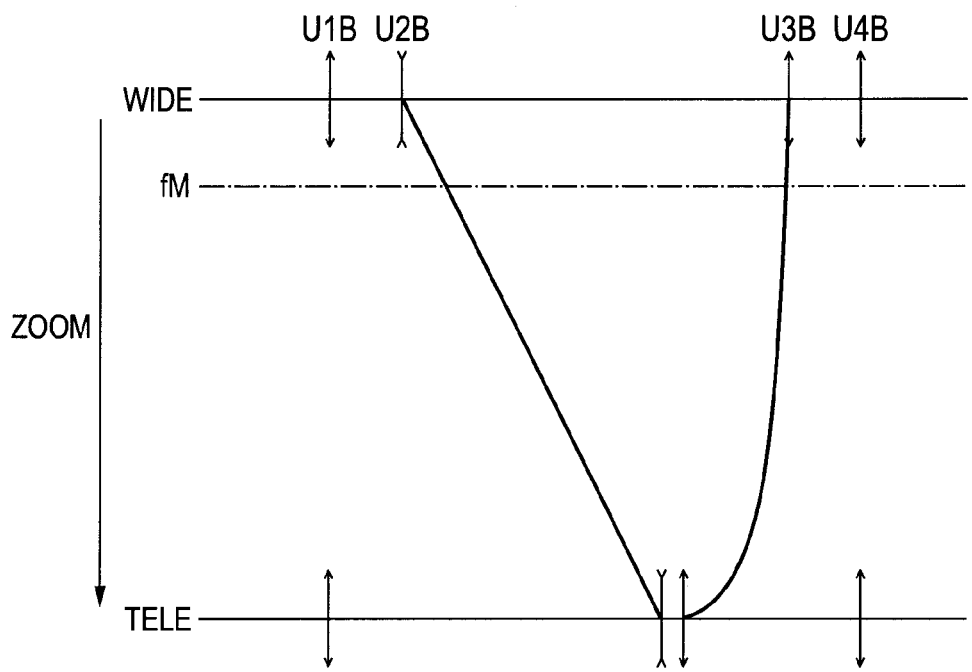
FIG. 13B is a schematic diagram of a four-unit zoom lens.

FIGS. 13A and 13B are a schematic diagram of a zoom lens according to the present invention and a schematic diagram showing a refractive power arrangement of a four-unit zoom lens, respectively. In the cross sectional views of the zoom lenses, a left side corresponds to an object (subject) side (i.e. front side), and a right side corresponds to an image side (i.e. rear side). A first lens unit U1 having a positive refractive power does not move for zooming. A second lens unit (variator) U2 having a negative refractive power moves on an optical axis linearly toward the image side for zooming (magnification-varying) from a wide-angle end to a telephoto end. A third lens unit (variator) U3 having a negative refractive power moves on the optical axis non-linearly for zooming from the wide-angle end to the telephoto end.

A fourth lens unit (compensator) U4 having a positive refractive power moves on the optical axis non-linearly to compensate image position variation due to zooming. The zoom lens also has an aperture stop SP and a fifth lens unit (imaging lens unit) U5 having a positive refractive power for imaging, which does not move for zooming. The fifth lens unit U5 may include a converter (or extender) used to convert a focal length. The zoom lens further includes a color separating prism and optical filter etc, which are illustrated as a glass block DG in the cross sectional views. An image plane IP, which corresponds to an image pickup surface of a solid state image pickup element, is also illustrated in the cross sectional views.

In the spherical aberration diagrams, solid curves and broken curves represent spherical aberrations with respect to an e-line and a g-line, respectively. In the astigmatism diagrams, solid curves and alternate long and short dashed curves represent sagittal image plane and meridional image plane, respectively. Lateral chromatic aberration diagrams illustrate lateral chromatic aberration with respect to the g-line. In the aberration diagrams, half angle of view ω and F-number Fno are also presented. In the following description of the embodiments, the terms "wide-angle end" and "telephoto end" refer to zoom positions at which the zooming lens units are at the ends of their respective mechanically movable ranges on the optical axis.

In the zoom lenses according to the embodiments, refractive power arrangement of the lens units at the wide-angle end and loci of movement of the second lens unit and the third lens unit during zooming are specified, then size reduction and weight reduction of the whole system and aberration correction are effectively enabled.

In specifically definition, an air interval between the second lens unit U2 and the third lens unit U3 at the wide-angle end is denoted by L2w, an air interval between the third lens unit U3 and the fourth lens unit U4 at the wide-angle end is denoted by L3w, a focal length of the first lens unit U1 is denoted by f1, and a combined focal length of the second lens unit U2 and the third lens unit U3 at the wide-angle end is denoted by f23w. Here, the following conditional expression is satisfied:

$$fw \cdot Z^{0.02} < fz1 < fw \cdot Z^{0.35} \quad (a1),$$

where fw is a focal length of the whole zoom lens system at the wide-angle end, Z is a zoom ratio, and fz1 is a focal length of the whole zoom lens system in a wide angle zoom range z1 of FIG. 13A. In other words, the wide angle zoom range z1 refers to a zoom range (magnification-varying range) in which a magnification-varying ratio relative to the magnification-varying ratio at the wide-angle end ranges from $Z^{0.02}$ to $Z^{0.35}$. Replacing fz1 in the above conditional expression (a1) by $fw \cdot Z^{A1}$ yields the following transformation:

$$0.02 < A1 < 0.35 \quad (a1-1).$$

A smallest value of the air interval between the second lens unit U2 and the third lens unit U3 in the wide angle zoom range z1 defined as above is denoted by L2z1a. Then, the zoom lens satisfies the following conditional expressions:

$$1.50 < L2w/L2z1a < 1600.00 \quad (1),$$

$$0.05 < L2w/L3w < 0.60 \quad (2), \text{ and}$$

$$-14.50 < f1/f23w < -10.00 \quad (3).$$

Hereinafter, the loci of movements of the lens units during zooming in the embodiments will be described with reference to FIGS. 13A and 13B.

In order to clearly contrast the lens units in the five-unit zoom lens according to the present invention shown in FIG. 13A and the lens units in the four-unit zoom lens shown in FIG. 13B, the first to fifth lens units in FIG. 13A are denoted by U1 to U5 as with those in the cross sectional views of the zoom lens. The first to fourth lens units in FIG. 13B are denoted by U1B to U4B. Each of the zoom lenses according to the embodiments is composed of the first to fifth lens units arranged in order from the object side to the image side as shown in FIG. 13A.

Specifically, the zoom lens is composed of the first lens unit U1 having a positive refractive power, the second lens unit U2 having a negative refractive power for magnification-varying, the third lens unit U3 having a negative refractive power, the fourth lens unit U4 having a positive refractive power for compensating image position variation due to zooming and the fifth lens unit U5 having a positive refractive power for imaging. In the four unit zoom lens, as shown in FIG. 13B, the second lens unit U2B is moved by a large distance toward the image side during zooming in order to make a magnification at the wide angle end (WIDE) high. This results in an increase in an interval between the first lens unit U1B and the second lens unit U2B during zooming, leading to an increase in an incidence ray height of off-axis rays on the first lens unit U1B.

For the above reason, the incidence ray height of off-axis rays on the first lens unit U1B becomes highest at a zoom position fM a little zoomed from the wide-angle end toward the telephoto side, and then an effective diameter of the first lens unit U1B is determined. In the case of the four-unit zoom lens, a locus of movement of the third lens unit U3B during zooming is uniquely determined for image position compensation with zooming. Specifically, in the case where the second lens unit U2B moves linearly as shown in FIG. 13B, the locus of movement of the third lens unit U3B is determined in such a way that it moves non-linearly toward the object side as zooming is performed from the wide-angle end to the telephoto end.

On the other hand, in the case of the five-unit zoom lenses according to the embodiments in which the magnification-varying lens units are three movable lens units as shown in FIG. 13A, the locus of movement of the third lens unit U3 can be set arbitrarily by performing image position compensation using the fourth lens unit U4.

In the zoom lenses according to the embodiments, the third lens unit U3 is adapted to be moved in such a way that the third lens unit U3 is located closer to the object than its position at the wide-angle end in the wide angle zoom range z1 shown in FIG. 13A and defined by the conditional expression (a1). The displacement of the third lens unit U3 toward the object side provides the effect of shifting the focal length to the telephoto side. This leads to a reduction in the amount of movement of the second lens unit U2 during zooming in the wide angle zoom range z1. In the zoom lenses according to the embodiments, the air interval between the second lens unit U2 and the third lens unit U3 assumes its smallest value L2z1a at a zoom position z1a in the wide angle zoom range z1. The conditional expression (1) limits a value of the ratio of the smallest air interval L2z1s to the air interval L2w between the second lens unit U2 and the third lens unit U3 at the wide-angle end.

If L2w/L2z1a is equal to or larger than the upper limit of the conditional expression (1), the effect of reducing the ray height of off-axis rays incident on the first lens unit U1 in the wide angle zoom range z1 becomes small, making the effect of reducing the size and weight of the first lens unit U1 small. If L2w/L2z1a is equal to or smaller than the lower limit of the conditional expression (1), the air interval between the second lens unit U2 and the third lens unit U3 becomes unduly small in the wide angle zoom range, possibly leading to an interference of the lens units if the lens units are driven at high speed. This is undesirable from the manufacturing point of view. In the context herein, the wide angle zoom range z1 refers to the zoom range in which, as defined by the conditional expression (a1), the magnification-varying ratio relative to that at the wide-angle end ranges from $Z^{0.02}$ to $Z^{0.35}$.

By appropriately setting the locus of movement of the third lens unit U3 during zooming in the wide angle zoom range, the ray height of the off-axis rays incident on the first lens unit U1 at the zoom position fM is made small, and then the effective diameter of the first lens unit U1 is easily reduced. Moreover, a reduction in the effective diameter of the first lens unit U1 necessarily leads to a reduction in the lens thickness. Therefore, the size and weight of the first lens unit U1, which dominantly contributes to the overall weight of the zoom lens, is easily reduced.

The conditional expression (2) limits a value of the ratio of the air interval L3w between the third lens unit U3 and the fourth lens unit U4 at the wide-angle end to the air interval L2w between the second lens unit U2 and the third lens unit U3 at the wide-angle end. If the conditional expression (2) is satisfied, the effect of shifting the focal length at the wide-angle end to the wide-angle side is easily achieved, and then the angle of view and the zoom ratio becomes easily higher.

If L2w/L3w is equal to or larger than the upper limit of the conditional expression (2), the combined focal length of the second lens unit U2 and the third lens unit U3 becomes too short in the wide angle range. In consequence, the incidence height of off-axis rays on the first lens unit U1 becomes high, leading to an increase in the lens diameter. If L2w/L3w is equal to or smaller than the lower limit of the conditional expression (2), an amount of movement of the second lens unit U2 in the wide angle zoom range z1 is increased, and the effect of reducing the ray height of off-axis rays incident on the first lens unit U1 becomes small. In consequence, it is difficult to achieve a reduction in the size and weight of the first lens unit U1.

The Conditional expression (3) limits a value of the ratio of the combined focal length f23w of the second lens unit U2 and the third lens unit U3 at the wide-angle end to the focal length f1 of the first lens unit U1. If the conditional expression (3) is satisfied, a high zoom ratio and a reduction in the size and weight of the first lens unit U1 are expected to be achieved. If f1/f23w is equal to or larger than the upper limit of the conditional expression (3), the combined focal length f23w of the second lens unit U2 and the third lens unit U3 at the wide-angle end is too short relative to the focal length of the first lens unit U1. In consequence, the height of incidence of off-axis rays on the first lens unit U1 becomes high, leading to an increase in the lens diameter. If f1/f23w is equal to or smaller than the lower limit of the conditional expression (3), the combined focal length f23w of the second lens unit U2 and the third lens unit U3 at the wide-angle end is too long relative to the focal length of the first lens unit U1, leading to a refractive power arrangement with which it is difficult to make the zoom ratio high. Therefore, it is difficult to achieve a high zoom ratio and a reduction in the overall size of the system. It is more preferred that the numerical ranges of the conditional expressions (1) to (3) be further limited as follows.

$$2.0 < L2w/L2z1a < 1200.00 \quad (1a),$$

$$0.07 < L2w/L3w < 0.54 \quad (2a), \text{ and}$$

$$-14.20 < f1/f23w < -10.20 \quad (3a).$$

By appropriately setting the refractive power arrangement of the lens units and the loci of movement of the movable lens units for zooming, a zoom lens having a high zoom ratio of 70 or higher and a wide angle of view of 60 degrees or larger at the wide-angle end is provided. In the zoom lenses according to the embodiments, it is more preferred that one or more of the following conditional expressions be further satisfied.

Here, a telephoto zoom range z2 is defined as a zoom range (or magnification-varying range) in which the following conditional expression is satisfied:

$$fw \cdot Z^{0.55} < fz2 < fw \cdot Z^{0.85} \quad (a2),$$

where fz2 is a focal length of the whole zoom lens system in the telephoto zoom range z2. In other words, the telephoto zoom range z2 refers to the zoom range (magnification-varying range) in which the magnification-varying ratio relative to that at the wide-angle end ranges from $Z^{0.55}$ to $Z^{0.85}$. Replacing fz2 in the above conditional expression (a2) by $fw \cdot Z^{A2}$ yields the following transformation:

$$0.55 < A2 < 0.85 \quad (a2\text{-}1).$$

A smallest value of the air interval between the second lens unit U2 and the third lens unit U3 in the telephoto zoom range z2 defined as above is denoted by L2z2a.

Furthermore, an air interval between the second lens unit U2 and the third lens unit U3 at the telephoto end is denoted by L2t, a focal lengths of the second lens unit U2 is denoted by f2, a focal lengths of the third lens unit U3 is denoted by f3, and a focal lengths of the fourth lens unit U4 is denoted by f4. A lateral magnification of the fourth lens unit U4 at the wide-angle end is denoted by β4w and a lateral magnification of the fourth lens unit U4 at the telephoto end is denoted by β4t.

It is preferred that one or more of the following conditional expressions be satisfied:

$$0.85 < L2w/L2t < 11.50 \quad (4),$$

$$1.50 < L2w/L2z2a < 1000.00 \quad (5),$$

$$-3.00 < L2w/f2 < -0.50 \quad (6),$$

$$0.15 < f2/f3 < 0.50 \quad (7),$$

$$3.50 < f1/f4 < 4.50 \quad (8), \text{ and}$$

$$2.00 < \beta 4t/\beta 4w < 7.00 \quad (9).$$

The conditional expression (4) limits a value of the ratio of the air interval L2w between the second lens unit U2 and the third lens unit U3 at the wide-angle end and the air interval L2t of the second lens unit U2 and the third lens unit U3 at the telephoto end. In the zoom lenses according to the embodiments, the air interval L2w between the second lens unit U2 and the third lens unit U3 is expanded at the wide-angle end as seen from FIG. 13A, and then a combined focal length of the second lens unit U2 and the third lens unit U3 at the wide-angle end becomes short, the focal length at the wide-angle end is easily shifted more to the wide-angle side. Furthermore, appropriate setting of the air interval between the second lens unit U2 and the third lens unit U3 at the telephoto end facilitates preventing the focal length at the telephoto end from shifting to the wide-angle side. Thus, the amount of movement of lens units needed for magnification-varying can be made smaller by appropriately setting the air interval between the second lens unit U2 and the third lens unit U3 at the wide-angle end and the air interval between the second lens unit U2 and the third lens unit U3 at the telephoto end.

In the zoom lenses according to the embodiments, the ratio of these air intervals is arranged to satisfy the conditional expression (4) to thereby effectively reduce the total length of the zoom lens. If L2w/L2t is equal to or larger than the upper limit of the conditional expression (4), the combined focal length of the second lens unit U2 and the third lens unit U3 at the wide-angle end becomes too long. In consequence, the ray height of off-axis rays incident on the first lens unit U1 becomes high, leading to an increase in the lens diameter. If L2w/L2t is equal to or smaller than the lower limit of the conditional expression (4), the focal length at the telephoto end shifts to the wide-angle side. In consequence, the amount of movement of movable lens units needed to achieve a desired zoom ratio becomes large, leading to an increase in the total length of the zoom lens.

The conditional expression (5) limits a value of the ratio of the air interval L2w between the second lens unit U2 and the third lens unit U3 at the wide-angle end and the smallest value L2z2a of the air interval between the second lens unit U2 and the third lens unit U3 in the telephoto zoom range z2 defined by the conditional expression (a2) for the telephoto side. Satisfying the conditional expression (5) facilitates a reduction in the weight of the fourth lens unit U4, which has the largest lens weight among the movable lens units.

If L2w/L2z2a is equal to or larger than the upper limit of the conditional expression (5), the air interval between the second lens unit U2 and the third lens unit U3 in the telephoto zoom range z2 becomes too small, possibly leading to an interference of the lens units if the lens units are driven at high speed. This is undesirable from the manufacturing point of view. If L2w/L2z2a is equal to or smaller than the lower limit of the conditional expression, an amount of movement of the fourth lens unit U4 in the telephoto zoom range z2 becomes large, making the fourth lens unit U4 distant from the aperture stop SP in the telephoto zoom range z2, and then the lens diameter of the fourth lens unit U4 becomes large.

The conditional expression (6) limits a value of the ratio of the focal length f2 of the second lens unit U2 and the air interval L2w between the second lens unit U2 and the third lens unit U3 at the wide-angle end. If the conditional expression (6) is satisfied, a reduction in the size and weight of the first lens unit U1 and control of aberration variation due to zooming are achieved. If L2w/f2 is equal to or larger than the upper limit of the conditional expression (6), the interval between the second lens unit U2 and the third lens unit U3 becomes relatively small at the wide-angle end, leading to difficulties in reducing the size and weight of the first lens unit and in reducing the total length of the zoom lens. If L2w/f2 is equal to or smaller than the lower limit of the conditional expression (6), the focal length of the second lens unit U2 becomes relatively short, leading to difficulties in controlling aberration variation due to zooming.

The conditional expression (7) limits a value of the ratio of the focal length of the second lens unit U2 and the focal length of the third lens unit U3. If the conditional expression (7) is satisfied, a reduction in the size and weight of the first lens unit U1 and control of aberration variation are expected to be achieved. If f2/f3 is equal to or larger than the upper limit of the conditional expression (7), the focal length of the third lens unit U3 becomes relatively too short, necessitating an increase in an amount of movement of the second lens unit U2, which serves as the main magnification-varying lens unit. Then, it is difficult to achieve a high zoom ratio and a reduction in the total length of the zoom lens. If f2/f3 is equal to or smaller than the lower limit of condition (7), the focal length of the third lens unit U3 becomes relatively long, making an amount of movement of lens units needed to reduce the height of incidence of off-axis rays on the first lens unit U1 large. In consequence, it is difficult to control variation in spherical aberration and coma with movement of lens units.

The conditional expression (8) limits a value of the ratio of the focal length f1 of the first lens unit U1 and the focal length f4 of the fourth lens unit U4. If the conditional expression (8) is satisfied, a reduction in the size and weight of the first lens unit U1 and control of aberration variation due to zooming are expected to be achieved. If f1/f4 is equal to or larger than the upper limit of the conditional expression (8), the focal length of the fourth lens unit U4 becomes too short relative to the focal length of the first lens unit U1, leading to large variation in spherical aberration during zooming. If f1/f4 is equal to or smaller than the lower limit of the conditional expression (8), the focal length of the first lens unit U1 becomes too short relative to the focal length of the fourth lens unit U4, making it difficult to reduce the ray height of off-axis rays incident on the first lens unit U1 and leading to an increase in the lens diameter.

The conditional expression (9) limits a value of the ratio of the lateral magnification β4w of the fourth lens unit U4 at the wide-angle end and the lateral magnification β4t of the fourth lens unit U4 at the telephoto end. If the conditional expression (9) is satisfied, a high zoom ratio higher than 70 and prevention of axial chromatic aberration at the telephoto end are expected to be achieved in the zoom lens. If β4t/β4w is equal to or larger than the upper limit of the conditional expression (9), an amount of movement of the fourth lens unit U4 becomes large, leading to a large total length of the zoom lens and to difficulties in preventing aberration variation. If β4t/β4w is equal to or smaller than the lower limit of the conditional expression (9), it is difficult to increase the magnification-varying ratio by the fourth lens unit U4, leading to difficulties in achieving a high zoom ratio.

It is preferred that the third lens unit U3 has at least one aspheric surface. Having an aspheric surface in the third lens unit U3, which can move, facilitates effective correction of off-axis aberrations such as coma during zooming.

It is more preferred that the numerical ranges of the conditional expressions (4) to (9) be further limited as follows:

$$0.90 < L2w/L2t < 11.00 \tag{4a}$$

$$2.00 < L2w/L2z2a < 900.00 \tag{5a}$$

$$-2.80 < L2W/f2 < -0.55 \tag{6a}$$

$$0.16 < f2/f3 < 0.46 \tag{7a}$$

$$3.70 < f1/f4 < 4.30 \tag{8a}$$

$$2.50 < \beta 4t/\beta 4W < 6.50 \tag{9a}$$

Hereinafter, specific features of the configuration of the zoom lenses according to Numerical Embodiments 1 to 6 of the present invention are described.

First Embodiment

A description is made of the second lens unit U2, the third lens unit U3 and the fourth lens unit U4 in the zoom lens according to the first embodiment corresponding to Numerical Embodiment 1. These lens units are movable lens units that move during zooming. The second lens unit U2 includes the 11th to 15th lens surfaces in Numerical Embodiment 1 and is composed, in order from the object side to the image side, of a negative lens and a cemented lens made up of a negative lens and a positive lens that are arranged in this order and cemented together. The third lens unit U3 includes the 16th to 18th lens surfaces in Numerical Embodiment 1 and is composed of a cemented lens made up of a negative lens and a positive lens that are arranged in this order and cemented together.

The fourth lens unit U4 includes the 19th to 27th lens surfaces in Numerical Embodiment 1 and is composed, in order from the object side to the image side, of two positive lenses, a cemented lens made up of a negative lens and a positive lens that are arranged in this order and cemented together, and a positive lens. The 11th, 20th and 26th lens surfaces are aspheric surfaces. The 11th lens surface mainly provides correction of distortion in the wide-angle side, the 20th lens surface provides correction of off-axis aberrations such as coma in the wide-angle side, and the 26th lens surface provides correction of spherical aberration in the telephoto side.

Values of the terms associated with the conditional expressions mentioned in the foregoing are presented for this embodiment in Table 1. This Numerical Embodiment satisfies all of the conditional expressions. The zoom lens according to this Numerical Embodiment is small in size and light in weight with a diameter of the lens on the most object side in the first lens unit U1 of 203.09 mm while having excellent optical performance, a wide angle of view with a focal length of 8.7 mm at the wide-angle end and a high zoom ratio of 125.

Second Embodiment

The zoom lens according to the second embodiment corresponding to Numerical Embodiment 2 has the same lens configuration as the first embodiment and satisfies all the conditional expressions as seen from Table 1 to have excellent optical performance. The zoom lens according to this embodiment is small in size and light in weight with a diameter of the lens on the most object side in the first lens unit U1 of 212.59 mm while having a wide angle of view with a focal length of 8.5 mm at the wide-angle end and a high zoom ratio of 100.

Third Embodiment

The zoom lens according to the third embodiment corresponding to Numerical Embodiment 3 has the same lens configuration as the first embodiment and satisfies all the conditional expressions as seen from Table 1 to have excellent optical performance. The zoom lens according to this embodiment is small in size and light in weight with a diameter of the lens on the most object side in the first lens unit U1 of 210.28 mm while having a wide angle of view with a focal length of 8.4 mm at the wide-angle end and a high zoom ratio of 80.

Fourth Embodiment

A description is made of the second lens unit U2, the third lens unit U3 and the fourth lens unit U4 in the zoom lens according to the fourth embodiment corresponding to Numerical Embodiment 4. These lens units are movable lens units that move during zooming. The second lens unit U2 includes the 11th to 15th lens surfaces in Numerical Embodiment 4 and is composed, in order from the object side to the image side, of a negative lens and a cemented lens made up of a negative lens and a positive lens that are arranged in this order and cemented together. The third lens unit U3 includes the 16th and 17th lens surfaces in Numerical Embodiment 4 and is composed of a negative lens. The fourth lens unit U4 includes the 18th to 26th lens surfaces in Numerical Embodiment 4 and is composed, in order from the object side to the image side, of two positive lenses, a cemented lens made up of a negative lens and a positive lens that are arranged in this order and cemented together, and a positive lens. The 11th, 19th and 25th lens surfaces are aspheric surfaces. The 11th lens surface mainly provides correction of distortion in the wide-angle side, the 19th lens surface provides correction of off-axis aberrations such as coma in the wide-angle side, and the 25th lens surface provides correction of spherical aberration in the telephoto side.

Although the third lens unit U3 is composed of one negative lens, the zoom lens according to this embodiment satisfies all the conditional expressions as seen from Table 1 to have excellent optical performance. The zoom lens according to this embodiment is small in size and light in weight with a diameter of the lens on the most object side in the first lens unit U1 of 190.22 mm while having a wide angle of view with a focal length of 9.5 mm at the wide-angle end and a high zoom ratio of 90.

Fifth Embodiment

A description is made of the second lens unit U2, the third lens unit U3 and the fourth lens unit U4 in the zoom lens according to the fifth embodiment corresponding to Numerical Embodiment 5. These lens units are movable lens units that move during zooming. The second lens unit U2 includes the 11th to 15th lens surfaces in Numerical Embodiment 5 and is composed, in order from the object side to the image side, of a negative lens and a cemented lens made up of a negative lens and a positive lens that are arranged in this order and cemented together. The third lens unit U3 includes the 16th to 18th lens surfaces in Numerical Embodiment 5 and is composed of a cemented lens made up of a negative lens and a positive lens that are arranged in this order and cemented together.

The fourth lens unit U4 includes the 19th to 27th lens surfaces in Numerical Embodiment 5 and is composed, in order from the object side to the image side, of two positive lenses, a cemented lens made up of a negative lens and a positive lens that are arranged in this order and cemented together, and a positive lens. The 11th, 18th, 20th and 26th lens surfaces are aspheric surfaces. The 11th lens surface mainly provides correction of distortion in the wide-angle side, the 18th lens surface provides correction of off-axis aberrations such as coma in the wide-angle side, the 20th lens surface provides correction of off-axis aberrations such as coma in the wide-angle side, and the 26th lens surface provides correction of spherical aberration in the telephoto side.

In the zoom lens according to this embodiment, the rearmost lens surface in the third lens unit U3 has an aspheric shape to provide further improved correction of aberration variation throughout the whole zoom range. The zoom lens according to this embodiment satisfies all the conditional expressions as seen from Table 1 to have excellent optical performance. The zoom lens according to this embodiment is small in size and light in weight with a diameter of the lens on the most object side in the first lens unit U1 of 200.11 mm while having a wide angle of view with a focal length of 9.0 mm at the wide-angle end and a high zoom ratio of 120.

Sixth Embodiment

The zoom lens according to the sixth embodiment corresponding to Numerical Embodiment 6 has the same lens configuration as the fourth embodiment. Although the second lens unit U3 is composed of one negative lens, the zoom lens according to this embodiment satisfies all the conditional expressions as seen from Table 1 to have excellent optical performance. The zoom lens according to this embodiment is small in size and light in weight with a diameter of the lens on the most object side in the first lens unit U1 of 188.70 mm while having a wide angle of view with a focal length of 9.5 mm at the wide-angle end and a high zoom ratio of 70.

Figure 14:
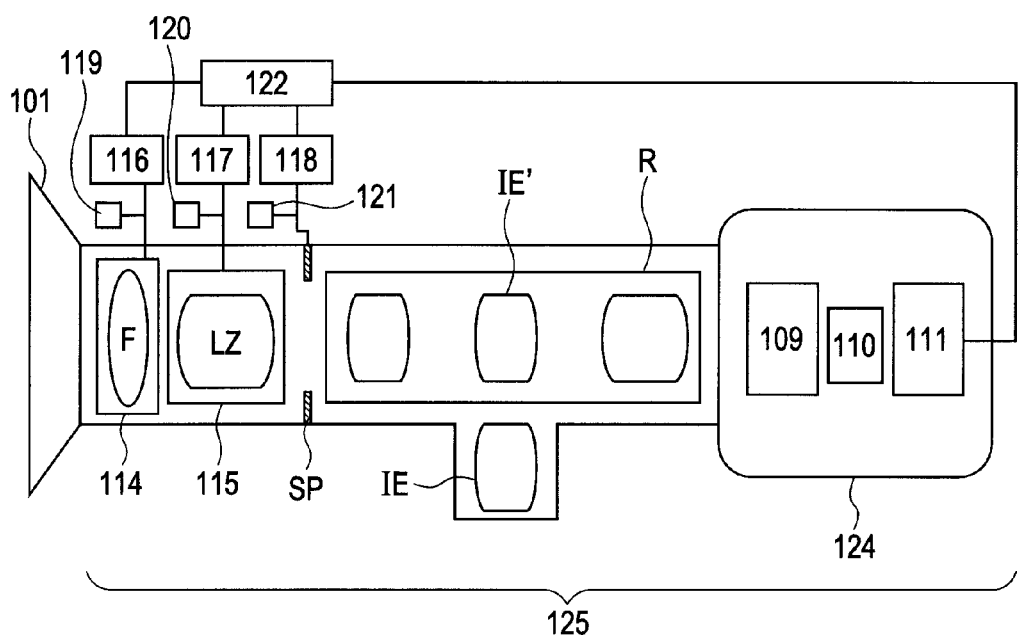
FIG. 14 is a diagram illustrating a principal part of an image pickup apparatus according to the present invention.

FIG. 14 is a diagram showing a principal part of an image pickup apparatus (TV camera system) using a zoom lens as an image taking optical system according to any one of the first to sixth embodiments of the present invention. The image pickup apparatus shown in FIG. 14 is equipped with a zoom lens 101 according to any one of the first to sixth embodiments and a camera 124. The zoom lens 101 is detachably attached on the camera 124. The image pickup apparatus 125 comprises the camera 124 on which the zoom lens 101 is attached. The zoom lens has a first unit F, a magnification-varying section LZ and a fifth lens unit R for imaging. The first lens unit F includes a lens unit for focusing.

The magnification-varying section LZ includes second and third lens units that move on the optical axis to vary the magnification and a fourth unit that moves on the optical axis to correct image position variation due to magnification-varying. The zoom lens 101 further has an aperture stop SP. The fifth lens unit R has lens units IE' and IE that can be inserted into and retracted out of the optical path. Switching the lens units IE and IE' provides a shift of the focal length range of the whole zoom lens system 101. The zoom lens 101 has drive mechanisms 114 and 115 such as helicoids and cams for driving the first lens unit F and the magnification-varying section LZ on the direction of the optical axis. Motor (drive unit) 116 to 118 are provide to electrically drive the drive mechanisms 114 and 115 and the aperture stop SP.

The zoom lens 101 is equipped with detectors 119 to 121 such as an encoder, potentiometer, and/or photo sensor used to sense the position of the first lens unit F and the magnification-varying section LZ and the aperture diameter of the aperture stop SP. The camera 124 has a glass block 109 including an optical filter and color separating optical system provided in the camera 124 and a solid state image pickup element (photoelectric conversion element) 110, such as a CCD sensor or CMOS sensor, which receives an image of an object formed by the zoom lens 101. The image pickup apparatus also has CPU 111 and CPU 122 that control various operations of the camera 124 and the zoom lens 101.

Thus, an image pickup apparatus having excellent optical performance is achieved by using the zoom lens according to the present invention in a TV camera. While preferred embodiments of the present invention have been described, the present invention is not limited to the embodiments, but various changes and modifications may be made without departing from the essence of the present invention.

Hereinafter, Numerical Embodiments 1 to 6 corresponding to the first to sixth embodiments of the present invention is presented. The following data of the Numerical Embodiments includes the surface number i counted from the object side, the curvature radius ri of the i-th surface counted from the object side, the interval between the i-th surface and the (i+1)-th surface counted from the object side, the refractive index ndi of the i-th optical member, and the Abbe constant υi of the i-th optical member. The last three surfaces belong to the glass block such as a filter. The focal lengths, the F-numbers and the angles of view presented in the following are those in the state in which the zoom lens is focused on an object at infinity. The value BF is the equivalent air length from the rearmost surface of the glass block to the image plane.

Aspheric surfaces are represented by the following equation in terms of the coordinate x taken on the direction of the optical axis and the coordinate y taken on the direction perpendicular to the optical axis:

$$x=(y^2/r)/\{1+(1-k\cdot y^2/r^2)^{0.5}\}+A2\cdot y^2+A3\cdot y^3+A4\cdot y^4+A5\cdot y^5+A6\cdot y^6+A7\cdot y^7+A8\cdot y^8+A9\cdot y^9+A10\cdot y^{10}+A11\cdot y^{11}+A12\cdot y^{12},$$

where r is the basic curvature radius, k is the conic constant, and An is the n-th order aspheric coefficient. The expression "e-x" stands for "×10$^{-x}$". The aspheric lens surfaces are marked by * suffixed to the surface numbers.

The values of the terms associated with the conditional expressions mentioned in the foregoing are presented in Table 1 for all the embodiments.

Numerical Embodiment 1
Unit: mm

Surface data

| Surface Number (i) | r | d | nd | νd | Effective Diameter |
|---|---|---|---|---|---|
| 1 | 7000.000 | 6.00 | 1.83400 | 37.2 | 203.09 |
| 2 | 357.549 | 1.96 | | | 192.96 |
| 3 | 356.531 | 24.92 | 1.43387 | 95.1 | 193.26 |
| 4 | −605.435 | 26.02 | | | 193.79 |
| 5 | 372.742 | 19.72 | 1.43387 | 95.1 | 196.72 |
| 6 | −1461.432 | 0.25 | | | 196.33 |
| 7 | 232.326 | 19.14 | 1.43387 | 95.1 | 190.68 |
| 8 | 1031.534 | 1.20 | | | 189.38 |
| 9 | 206.041 | 12.86 | 1.49700 | 81.5 | 179.92 |
| 10 | 387.144 | (variable) | | | 178.17 |
| 11* | 5024.881 | 2.20 | 2.00330 | 28.3 | 52.56 |
| 12 | 48.879 | 9.90 | | | 46.05 |
| 13 | −88.090 | 1.40 | 1.88300 | 40.8 | 45.32 |
| 14 | 61.315 | 7.10 | 1.95906 | 17.5 | 44.85 |
| 15 | −290.607 | (variable) | | | 44.68 |
| 16 | −111.199 | 1.40 | 1.83400 | 37.2 | 36.72 |
| 17 | 62.286 | 4.26 | 1.92286 | 18.9 | 38.45 |
| 18 | 252.468 | (variable) | | | 38.92 |
| 19 | 210.433 | 12.69 | 1.60311 | 60.6 | 80.97 |
| 20* | −144.212 | 0.50 | | | 81.82 |
| 21 | 105.583 | 14.39 | 1.49700 | 81.5 | 83.44 |
| 22 | −276.431 | 0.20 | | | 82.89 |
| 23 | 105.463 | 2.50 | 1.84666 | 23.8 | 77.74 |
| 24 | 55.594 | 18.69 | 1.43875 | 94.9 | 72.46 |
| 25 | −733.979 | 0.41 | | | 70.93 |
| 26* | 446.666 | 5.73 | 1.49700 | 81.5 | 69.40 |
| 27 | −441.678 | (variable) | | | 68.15 |
| 28 (stop) | ∞ | 2.02 | | | 35.84 |
| 29 | −334.752 | 1.40 | 1.88300 | 40.8 | 34.64 |
| 30 | 78.766 | 3.63 | 1.84666 | 23.8 | 33.44 |
| 31 | −1049.387 | 3.76 | | | 32.89 |
| 32 | −98.560 | 1.85 | 1.81600 | 46.6 | 31.14 |
| 33 | 75.729 | 0.15 | | | 30.25 |
| 34 | 37.018 | 3.73 | 1.80809 | 22.8 | 30.21 |
| 35 | 85.092 | 3.70 | | | 29.49 |
| 36 | −123.596 | 1.58 | 1.88300 | 40.8 | 28.79 |
| 37 | 82.080 | 9.99 | | | 28.36 |
| 38 | ∞ | 16.91 | 1.59201 | 67.0 | 29.15 |
| 39 | ∞ | 6.21 | | | 30.11 |
| 40 | −101.163 | 5.88 | 1.54814 | 45.8 | 30.57 |
| 41 | −44.989 | 3.12 | | | 31.28 |
| 42 | −213.142 | 3.07 | 1.88300 | 40.8 | 30.47 |
| 43 | 35.976 | 9.93 | 1.51742 | 52.4 | 30.40 |
| 44 | −41.094 | 0.20 | | | 31.16 |
| 45 | 84.114 | 7.32 | 1.43875 | 94.9 | 30.75 |
| 46 | −29.006 | 2.50 | 1.88300 | 40.8 | 30.47 |
| 47 | −129.349 | 1.18 | | | 31.41 |
| 48 | 168.024 | 6.45 | 1.54814 | 45.8 | 31.66 |
| 49 | −38.960 | 14.45 | | | 31.63 |
| 50 | ∞ | 33.00 | 1.60859 | 46.4 | 60.00 |
| 51 | ∞ | 13.20 | 1.51633 | 64.2 | 60.00 |
| 52 | ∞ | 10.00 | | | 60.00 |
| image plane | ∞ | | | | |

Aspheric Surface Data

11th surface

K = 0.00000e+000    A4 = 3.99513e−007    A6 = 5.77528e−011
A8 = −7.16919e−013    A10 = 1.49059e−015    A12 = −1.07142e−018

20th surface

K = −1.70392e+001    A4 = −3.56784e−007    A6 = 2.16965e−010
A8 = −8.22372e−014    A10 = 2.58987e−017    A12 = −3.98128e−021

26th surface

κ = 1.15185e+002    A4 = 3.26764e−008    A6 = −1.57529e−010
K = −5.57145e−014    A10 = 9.28720e−017    A12 = −5.21195e−020

Various Data
Zoom ratio 125.00

| | Wide angle | Intermediate | Telephoto |
|---|---|---|---|
| Focal length | 8.70 | 100.00 | 1087.50 |
| F-number | 1.85 | 1.85 | 5.65 |
| Angle of view | 32.30 | 3.15 | 0.29 |
| Image height | 5.50 | 5.50 | 5.50 |
| Total lens length | 650.33 | 650.33 | 650.33 |
| BF | 10.00 | 10.00 | 10.00 |
| d10 | 2.79 | 155.37 | 197.63 |
| d15 | 38.26 | 8.55 | 20.90 |
| d18 | 247.59 | 100.25 | 1.99 |
| d27 | 3.00 | 27.46 | 71.12 |
| Entrance pupil position | 133.60 | 1055.10 | 12251.49 |
| Exit pupil position | 203.13 | 203.13 | 203.13 |
| Front principal point position | 140.69 | 1206.87 | 19462.61 |
| Rear principal point position | 1.30 | −90.00 | −1077.50 |

Numerical Embodiment 1
Unit: mm

Zoom Lens Unit Data

| Unit | Leading surface | Focal length | Lens structure length | Front principal point position | Rear principal point position |
|---|---|---|---|---|---|
| 1 | 1 | 257.84 | 112.06 | 64.22 | −18.92 |
| 2 | 11 | −37.78 | 20.59 | 2.47 | −12.78 |
| 3 | 16 | −102.19 | 5.66 | 1.00 | −1.94 |
| 4 | 19 | 63.84 | 55.11 | 12.61 | −26.21 |
| 5 | 28 | 46.22 | 155.25 | 62.41 | 25.05 |

Single Lens Data

| Lens | Leading surface | Focal length |
|---|---|---|
| 1 | 1 | −449.11 |
| 2 | 3 | 519.97 |
| 3 | 5 | 685.04 |
| 4 | 7 | 684.43 |
| 5 | 9 | 863.24 |
| 6 | 11 | −48.80 |
| 7 | 13 | −40.53 |
| 8 | 14 | 52.62 |
| 9 | 16 | −47.39 |
| 10 | 17 | 87.55 |
| 11 | 19 | 143.26 |
| 12 | 21 | 155.22 |
| 13 | 23 | −140.76 |
| 14 | 24 | 118.35 |
| 15 | 26 | 446.49 |
| 16 | 29 | −71.68 |
| 17 | 30 | 85.81 |
| 18 | 32 | −51.97 |
| 19 | 34 | 77.55 |
| 20 | 36 | −55.34 |
| 21 | 38 | 0.00 |
| 22 | 40 | 141.77 |
| 23 | 42 | −34.46 |
| 24 | 43 | 38.61 |
| 25 | 45 | 50.02 |
| 26 | 46 | −42.60 |
| 27 | 48 | 58.04 |
| 28 | 50 | 0.00 |
| 29 | 51 | 0.00 |

Numerical Embodiment 2
Unit: mm

Surface data

| Surface Number (i) | r | d | nd | vd | Effective Diameter |
|---|---|---|---|---|---|
| 1 | 7000.000 | 6.00 | 1.83400 | 37.2 | 212.59 |
| 2 | 355.689 | 2.11 | | | 202.25 |
| 3 | 358.331 | 26.47 | 1.43387 | 95.1 | 202.05 |
| 4 | −618.379 | 25.89 | | | 201.13 |
| 5 | 356.821 | 20.91 | 1.43387 | 95.1 | 198.08 |
| 6 | −1329.433 | 0.25 | | | 197.67 |
| 7 | 236.536 | 19.07 | 1.43387 | 95.1 | 191.67 |
| 8 | 1070.694 | 1.20 | | | 190.36 |
| 9 | 205.936 | 12.71 | 1.49700 | 81.5 | 180.55 |
| 10 | 378.914 | (variable) | | | 178.79 |
| 11* | −2273.125 | 2.20 | 2.00330 | 28.3 | 52.25 |
| 12 | 49.262 | 9.71 | | | 45.69 |
| 13 | −88.036 | 1.40 | 1.88300 | 40.8 | 44.93 |
| 14 | 51.969 | 7.67 | 1.95906 | 17.5 | 44.36 |
| 15 | −459.266 | (variable) | | | 44.15 |
| 16 | −115.354 | 1.40 | 1.83400 | 37.2 | 37.02 |
| 17 | 105.644 | 4.25 | 1.92286 | 18.9 | 38.49 |
| 18 | 952.225 | (variable) | | | 39.24 |
| 19 | 305.884 | 11.18 | 1.60311 | 60.6 | 74.14 |
| 20* | −140.794 | 0.50 | | | 75.30 |
| 21 | 104.878 | 12.66 | 1.59201 | 67.0 | 77.38 |
| 22 | −391.835 | 0.20 | | | 76.74 |
| 23 | 118.906 | 2.50 | 1.84666 | 23.8 | 73.35 |
| 24 | 57.325 | 17.97 | 1.43875 | 94.9 | 68.98 |
| 25 | −443.118 | 0.65 | | | 67.55 |
| 26* | 459.962 | 5.39 | 1.60311 | 60.6 | 66.00 |
| 27 | −620.084 | (variable) | | | 64.84 |
| 28 (stop) | ∞ | 1.30 | | | 34.21 |
| 29 | −981.746 | 1.40 | 1.88300 | 40.8 | 33.44 |
| 30 | 52.609 | 4.18 | 1.80518 | 25.4 | 32.13 |
| 31 | 4947.801 | 4.50 | | | 31.61 |
| 32 | −64.379 | 1.85 | 1.81600 | 46.6 | 30.07 |
| 33 | 75.378 | 1.22 | | | 29.69 |
| 34 | 36.566 | 4.06 | 1.80809 | 22.8 | 30.27 |
| 35 | 203.197 | 4.15 | | | 29.88 |
| 36 | −150.964 | 1.58 | 1.88300 | 40.8 | 28.64 |
| 37 | 67.008 | 10.00 | | | 28.16 |
| 38 | −125.315 | 1.91 | 1.71736 | 29.5 | 29.22 |
| 39 | 76.114 | 15.00 | 1.65160 | 58.5 | 29.98 |
| 40 | −72.158 | 3.57 | | | 32.37 |
| 41 | −403.126 | 6.45 | 1.54814 | 45.8 | 32.56 |
| 42 | −55.387 | 3.12 | | | 32.79 |
| 43 | −240.425 | 3.07 | 1.88300 | 40.8 | 31.44 |
| 44 | 41.762 | 7.82 | 1.51742 | 52.4 | 30.93 |
| 45 | −80.743 | 0.20 | | | 31.26 |
| 46 | 104.922 | 7.21 | 1.49700 | 81.5 | 31.09 |
| 47 | −28.804 | 2.50 | 1.83481 | 42.7 | 30.88 |
| 48 | −99.435 | 1.18 | | | 31.59 |
| 49 | 188.946 | 5.33 | 1.54814 | 45.8 | 31.46 |
| 50 | −47.537 | 14.45 | | | 31.29 |
| 51 | ∞ | 33.00 | 1.60859 | 46.4 | 60.00 |
| 52 | ∞ | 13.20 | 1.51633 | 64.2 | 60.00 |
| 53 | ∞ | 10.00 | | | 60.00 |
| image plane | ∞ | | | | |

Aspheric Surface Data

11th surface

K = 0.00000e+000  A4 = 3.34324e−007  A6 = 1.67264e−010
A8 = −1.08493e−012  A10 = 2.02231e−015  A12 = −1.34075e−018

20th surface

K = −1.65695e+001  A4 = −4.04553e−007  A6 = 1.97577e−010
A8 = −6.53791e−014  A10 = 2.42904e−017  A12 = −5.25875e−021

26th surface

K = 1.17483e+002  A4 = 3.98604e−008  A6 = −2.31833e−010
A8 = 9.49033e−014  A10 = −1.43520e−017  A12 = −2.00365e−020

Various Data
Zoom ratio 100.00

| | Wide angle | Intermediate | Telephoto |
|---|---|---|---|
| Focal length | 8.50 | 85.00 | 850.00 |
| F-number | 1.85 | 1.85 | 4.40 |
| Angle of view | 32.91 | 3.70 | 0.37 |
| Image height | 5.50 | 5.50 | 5.50 |
| Total lens length | 642.18 | 642.18 | 642.18 |
| BF | 10.00 | 10.00 | 10.00 |
| d10 | 2.94 | 148.23 | 197.14 |
| d15 | 31.49 | 19.01 | 30.00 |
| d18 | 250.22 | 89.43 | 2.20 |
| d27 | 3.00 | 30.97 | 58.30 |
| Entrance pupil position | 132.00 | 922.93 | 9508.22 |
| Exit pupil position | 272.25 | 272.25 | 272.25 |
| Front principal point position | 140.78 | 1035.48 | 13113.12 |

-continued

Numerical Embodiment 2
Unit: mm

| | | | |
|---|---|---|---|
| Rear principal point position | 1.50 | −75.00 | −840.00 |

Zoom Lens Unit Data

| Unit | Leading surface | Focal length | Lens structure length | Front principal point position | Rear principal point position |
|---|---|---|---|---|---|
| 1 | 1 | 256.86 | 114.60 | 66.15 | −18.50 |
| 2 | 11 | −35.33 | 20.98 | 2.84 | −12.37 |
| 3 | 16 | −135.64 | 5.65 | 0.30 | −2.65 |
| 4 | 19 | 64.53 | 51.04 | 11.64 | −23.50 |
| 5 | 28 | 49.90 | 152.26 | 62.15 | 19.01 |

Single Lens Data

| Lens | Leading surface | Focal length |
|---|---|---|
| 1 | 1 | −446.65 |
| 2 | 3 | 525.90 |
| 3 | 5 | 649.20 |
| 4 | 7 | 693.21 |
| 5 | 9 | 883.43 |
| 6 | 11 | −47.64 |
| 7 | 13 | −36.62 |
| 8 | 14 | 48.39 |
| 9 | 16 | −65.51 |
| 10 | 17 | 126.88 |
| 11 | 19 | 160.75 |
| 12 | 21 | 140.59 |
| 13 | 23 | −131.92 |
| 14 | 24 | 116.68 |
| 15 | 26 | 436.96 |
| 16 | 29 | −56.19 |
| 17 | 30 | 65.41 |
| 18 | 32 | −42.08 |
| 19 | 34 | 54.02 |
| 20 | 36 | −52.08 |
| 21 | 38 | −65.23 |
| 22 | 39 | 58.98 |
| 23 | 41 | 115.77 |
| 24 | 43 | −39.86 |
| 25 | 44 | 54.14 |
| 26 | 46 | 46.17 |
| 27 | 47 | −49.10 |
| 28 | 49 | 69.49 |
| 29 | 51 | 0.00 |
| 30 | 52 | 0.00 |

Numerical Embodiment 3
Unit: mm

Surface data

| Surface Number (i) | r | d | nd | vd | Effective Diameter |
|---|---|---|---|---|---|
| 1 | 7000.000 | 6.00 | 1.83400 | 37.2 | 210.28 |
| 2 | 356.263 | 2.27 | | | 199.45 |
| 3 | 362.915 | 25.88 | 1.43387 | 95.1 | 198.78 |
| 4 | −584.849 | 24.53 | | | 197.88 |
| 5 | 343.102 | 20.81 | 1.43387 | 95.1 | 196.49 |
| 6 | −1482.603 | 0.25 | | | 196.06 |
| 7 | 239.275 | 18.22 | 1.43387 | 95.1 | 190.15 |
| 8 | 996.003 | 1.20 | | | 188.85 |
| 9 | 200.376 | 13.52 | 1.49700 | 81.5 | 179.14 |
| 10 | 392.384 | (variable) | | | 177.39 |
| 11* | −795.547 | 2.20 | 2.00330 | 28.3 | 53.73 |
| 12 | 45.768 | 10.22 | | | 46.49 |
| 13 | −96.693 | 1.40 | 1.83481 | 42.7 | 45.94 |
| 14 | 46.285 | 7.95 | 1.92286 | 18.9 | 45.59 |
| 15 | −426.845 | (variable) | | | 45.47 |
| 16 | −114.770 | 1.40 | 1.83400 | 37.2 | 40.05 |
| 17 | 142.140 | 4.27 | 1.92286 | 18.9 | 41.62 |
| 18 | −2999.244 | (variable) | | | 42.43 |
| 19 | 551.909 | 9.86 | 1.60311 | 60.6 | 69.14 |
| 20* | −135.666 | 0.50 | | | 70.56 |
| 21 | 98.070 | 11.82 | 1.59201 | 67.0 | 73.34 |
| 22 | −348.797 | 0.20 | | | 72.90 |
| 23 | 121.306 | 2.50 | 1.84666 | 23.8 | 70.13 |
| 24 | 57.540 | 16.24 | 1.43875 | 94.9 | 66.34 |
| 25 | −815.265 | 1.41 | | | 65.13 |
| 26* | 425.218 | 6.25 | 1.60311 | 60.6 | 63.84 |
| 27 | −337.921 | (variable) | | | 62.80 |
| 28(stop) | ∞ | 1.69 | | | 32.73 |
| 29 | −248.272 | 1.40 | 1.88300 | 40.8 | 32.00 |
| 30 | 142.418 | 2.90 | 1.92286 | 18.9 | 31.29 |
| 31 | −358.613 | 3.57 | | | 30.86 |
| 32 | −85.303 | 1.85 | 1.81600 | 46.6 | 29.29 |
| 33 | 55.704 | 0.15 | | | 28.55 |
| 34 | 30.377 | 3.47 | 1.80809 | 22.8 | 28.86 |
| 35 | 49.659 | 7.07 | | | 28.15 |
| 36 | −77.766 | 1.58 | 1.88300 | 40.8 | 27.30 |
| 37 | −2959.427 | 35.20 | | | 27.44 |
| 38 | −762.104 | 3.07 | 1.83400 | 37.2 | 30.60 |
| 39 | 44.541 | 9.28 | 1.51742 | 52.4 | 31.01 |
| 40 | −39.572 | 0.20 | | | 31.78 |
| 41 | 55.502 | 8.31 | 1.43875 | 94.9 | 31.33 |
| 42 | −29.886 | 2.50 | 1.88300 | 40.8 | 30.93 |
| 43 | −162.236 | 1.18 | | | 31.62 |
| 44 | 116.223 | 7.77 | 1.54814 | 45.8 | 31.76 |
| 45 | −45.331 | 14.45 | | | 31.50 |
| 46 | ∞ | 33.00 | 1.60859 | 46.4 | 60.00 |
| 47 | ∞ | 13.20 | 1.51633 | 64.2 | 60.00 |
| 48 | ∞ | 10.16 | | | 60.00 |
| image plane | ∞ | | | | |

Aspheric Surface Data

11th surface

K = 0.00000e+000  A4 = 5.12010e−007  A6 = 2.85064e−010
A8 = −1.65263e−012  A10 = 2.88943e−015  A12 = −1.75465e−018

20th surface

K = −1.68786e+001  A4 = −4.69074e−007  A6 = 2.48017e−010
A8 = −1.33276e−013  A10 = 8.10905e−017  A12 = −2.19325e−020

26th surface

K = 9.27743e+001  A4 = 6.95897e−008  A6 = −3.08870e−010
A8 = 1.12117e−013  A10 = 1.45809e−017  A12 = −3.25773e−020

Various Data
Zoom ratio 80.00

| | Wide angle | Intermediate | Telephoto |
|---|---|---|---|
| Focal length | 8.40 | 75.00 | 672.00 |
| F-number | 1.85 | 1.85 | 3.50 |
| Angle of view | 33.22 | 4.19 | 0.47 |
| Image height | 5.50 | 5.50 | 5.50 |
| Total lens length | 628.68 | 628.68 | 628.68 |
| BF | 10.16 | 10.16 | 10.16 |
| d10 | 3.01 | 138.59 | 190.67 |
| d15 | 37.24 | 30.01 | 39.99 |
| d18 | 234.51 | 78.09 | 2.21 |
| d27 | 3.00 | 31.07 | 44.88 |
| Entrance pupil position | 130.82 | 825.33 | 7538.93 |
| Exit pupil position | 133.21 | 133.21 | 133.21 |
| Front principal point position | 139.80 | 946.05 | 11880.85 |
| Rear principal point position | 1.76 | −64.84 | −661.84 |

Numerical Embodiment 3
Unit: mm

Zoom Lens Unit Data

| Unit | Leading surface | Focal length | Lens structure length | Front principal point position | Rear principal point position |
|---|---|---|---|---|---|
| 1 | 1 | 250.41 | 112.68 | 64.11 | −18.96 |
| 2 | 11 | −35.06 | 21.77 | 2.17 | −13.90 |
| 3 | 16 | −158.14 | 5.67 | −0.23 | −3.20 |
| 4 | 19 | 63.76 | 48.78 | 11.81 | −22.14 |
| 5 | 28 | 39.49 | 151.86 | 59.18 | 14.49 |

Single Lens Data

| Lens | Leading surface | Focal length |
|---|---|---|
| 1 | 1 | −447.41 |
| 2 | 3 | 519.17 |
| 3 | 5 | 642.79 |
| 4 | 7 | 718.81 |
| 5 | 9 | 802.70 |
| 6 | 11 | −42.72 |
| 7 | 13 | −37.12 |
| 8 | 14 | 45.06 |
| 9 | 16 | −75.47 |
| 10 | 17 | 145.35 |
| 11 | 19 | 180.83 |
| 12 | 21 | 130.12 |
| 13 | 23 | −130.37 |
| 14 | 24 | 122.89 |
| 15 | 26 | 311.93 |
| 16 | 29 | −101.73 |
| 17 | 30 | 109.41 |
| 18 | 32 | −40.85 |
| 19 | 34 | 88.65 |
| 20 | 36 | −89.95 |
| 21 | 38 | −50.05 |
| 22 | 39 | 41.90 |
| 23 | 41 | 45.52 |
| 24 | 42 | −41.62 |
| 25 | 44 | 60.22 |
| 26 | 46 | 0.00 |
| 27 | 47 | 0.00 |

Numerical Embodiment 4
Unit: mm

Surface data

| Surface Number (i) | r | d | nd | vd | Effective Diameter |
|---|---|---|---|---|---|
| 1 | 7000.000 | 6.00 | 1.83400 | 37.2 | 190.22 |
| 2 | 354.934 | 1.95 | | | 190.00 |
| 3 | 353.874 | 25.13 | 1.43387 | 95.1 | 191.00 |
| 4 | −560.624 | 26.43 | | | 191.53 |
| 5 | 411.580 | 18.69 | 1.43387 | 95.1 | 193.93 |
| 6 | −1196.359 | 0.25 | | | 193.57 |
| 7 | 212.195 | 19.09 | 1.43387 | 95.1 | 187.56 |
| 8 | 762.349 | 1.20 | | | 186.24 |
| 9 | 211.539 | 11.87 | 1.49700 | 81.5 | 178.03 |
| 10 | 382.669 | (variable) | | | 176.35 |
| 11* | 2629.115 | 2.20 | 2.00330 | 28.3 | 48.43 |
| 12 | 44.692 | 9.36 | | | 42.69 |
| 13 | −81.300 | 1.40 | 1.88300 | 40.8 | 42.12 |
| 14 | 51.530 | 8.00 | 1.95906 | 17.5 | 42.16 |
| 15 | −188.135 | (variable) | | | 42.09 |
| 16 | −70.796 | 1.70 | 1.43875 | 94.9 | 39.48 |
| 17 | 552.855 | (variable) | | | 41.45 |
| 18 | 421.445 | 10.64 | 1.60311 | 60.6 | 75.21 |
| 19* | −141.276 | 0.50 | | | 76.53 |
| 20 | 88.319 | 13.88 | 0.00000 | 67.0 | 79.94 |
| 21 | −404.249 | 0.20 | | | 79.39 |
| 22 | 128.305 | 2.50 | 1.84666 | 23.8 | 75.42 |
| 23 | 57.049 | 17.67 | 1.43875 | 94.9 | 70.42 |
| 24 | −534.756 | 0.29 | | | 69.10 |
| 25* | 404.245 | 5.22 | 1.60311 | 60.6 | 67.74 |
| 26 | −622.350 | (variable) | | | 66.67 |
| 27(stop) | ∞ | 2.64 | | | 32.90 |
| 28 | −206.579 | 1.40 | 1.88300 | 40.8 | 31.54 |
| 29 | 115.045 | 3.06 | 1.92286 | 18.9 | 30.74 |
| 30 | −312.974 | 5.42 | | | 30.30 |
| 31 | −73.200 | 1.85 | 1.81600 | 46.6 | 27.50 |
| 32 | 51.917 | 1.50 | | | 26.77 |
| 33 | 31.331 | 2.53 | 1.80809 | 22.8 | 27.25 |
| 34 | 50.260 | 6.50 | | | 26.84 |
| 35 | −66.843 | 1.58 | 1.88300 | 40.8 | 26.30 |
| 36 | −172.448 | 29.46 | | | 26.55 |
| 37 | −243.768 | 3.07 | 1.83400 | 37.2 | 28.33 |
| 38 | 32.328 | 8.02 | 1.51742 | 52.4 | 28.92 |
| 39 | −35.001 | 0.20 | | | 29.38 |
| 40 | 163.644 | 6.79 | 1.43875 | 94.9 | 29.52 |
| 41 | −24.919 | 2.50 | 1.88300 | 40.8 | 29.48 |
| 42 | −64.062 | 1.18 | | | 31.16 |
| 43 | 135.605 | 6.56 | 1.54814 | 45.8 | 31.97 |
| 44 | −37.173 | 14.45 | | | 32.19 |
| 45 | ∞ | 33.00 | 1.60859 | 46.4 | 60.00 |
| 46 | ∞ | 13.20 | 1.51633 | 64.2 | 60.00 |
| 47 | ∞ | 9.98 | | | 60.00 |
| image plane | ∞ | | | | |

Aspheric Surface Data

11th surface

K = 0.00000e+000  A4 = 5.30417e−007  A6 = 1.03445e−010
A8 = −1.11094e−012  A10 = 2.61286e−015  A12 = −2.16029e−018

19th surface

K = −1.58427e+001  A4 = −3.87735e−007  A6 = 1.92726e−010
A8 = −8.25735e−014  A10 = 3.83843e−017  A12 = −8.36552e−021

25th surface

K = 8.10569e+001  A4 = −7.97052e−008  A6 = −1.95779e−010
A8 = −3.95742e−013  A10 = 9.37276e−017  A12 = −4.83418e−020

Various Data
Zoom ratio 90.00

| | Wide angle | Intermediate | Telephoto |
|---|---|---|---|
| Focal length | 9.30 | 90.00 | 837.00 |
| F-number | 1.85 | 1.85 | 4.40 |
| Angle of view | 30.60 | 3.50 | 0.38 |
| Image height | 5.50 | 5.50 | 5.50 |
| Total lens length | 626.70 | 626.70 | 626.70 |
| BF | 9.98 | 9.98 | 9.98 |
| d10 | 2.65 | 150.20 | 196.77 |
| d15 | 23.00 | 12.56 | 15.01 |
| d17 | 257.10 | 93.46 | 2.20 |
| d26 | 4.87 | 31.42 | 73.65 |
| Entrance pupil position | 129.36 | 925.52 | 8916.22 |
| Exit pupil position | 126.20 | 126.20 | 126.20 |
| Front principal point position | 139.40 | 1085.22 | 15780.93 |
| Rear principal point position | 0.68 | −80.03 | −827.01 |

Numerical Embodiment 4
Unit: mm

Zoom Lens Unit Data

| Unit | Leading surface | Focal length | Lens structure length | Front principal point position | Rear principal point position |
|---|---|---|---|---|---|
| 1 | 1 | 260.54 | 110.61 | 63.62 | −18.68 |
| 2 | 11 | −37.94 | 20.96 | 1.50 | −14.03 |
| 3 | 16 | −142.56 | 1.70 | 0.13 | −1.05 |
| 4 | 18 | 64.49 | 50.90 | 11.35 | −23.50 |
| 5 | 27 | 37.95 | 144.92 | 58.14 | 16.89 |

Single Lens Data

| Lens | Leading surface | Focal length |
|---|---|---|
| 1 | 1 | −445.65 |
| 2 | 3 | 502.94 |
| 3 | 5 | 706.53 |
| 4 | 7 | 668.98 |
| 5 | 9 | 927.59 |
| 6 | 11 | −44.96 |
| 7 | 13 | −35.34 |
| 8 | 14 | 42.32 |
| 9 | 16 | −142.56 |
| 10 | 18 | 176.00 |
| 11 | 20 | 122.90 |
| 12 | 22 | −122.11 |
| 13 | 23 | 118.28 |
| 14 | 25 | 405.52 |
| 15 | 28 | −83.03 |
| 16 | 29 | 90.35 |
| 17 | 31 | −36.79 |
| 18 | 33 | 96.11 |
| 19 | 35 | −123.77 |
| 20 | 37 | −33.84 |
| 21 | 38 | 33.71 |
| 22 | 40 | 49.71 |
| 23 | 41 | −47.34 |
| 24 | 43 | 53.68 |
| 25 | 45 | 0.00 |
| 26 | 46 | 0.00 |

Numerical Embodiment 5
Unit: mm

Surface Data

| Surface Number (i) | r | d | nd | vd | Effective Diameter |
|---|---|---|---|---|---|
| 1 | 7000.000 | 6.00 | 1.83400 | 37.2 | 200.11 |
| 2 | 356.376 | 1.92 | | | 193.65 |
| 3 | 354.498 | 25.09 | 1.43387 | 95.1 | 193.64 |
| 4 | −604.712 | 26.01 | | | 194.17 |
| 5 | 365.238 | 19.93 | 1.43387 | 95.1 | 197.14 |
| 6 | −1528.069 | 0.25 | | | 196.73 |
| 7 | 236.158 | 19.60 | 1.43387 | 95.1 | 191.10 |
| 8 | 1240.318 | 1.20 | | | 189.81 |
| 9 | 208.601 | 12.42 | 1.49700 | 81.5 | 179.89 |
| 10 | 381.767 | (variable) | | | 178.14 |
| 11* | 4604.939 | 2.20 | 2.00330 | 28.3 | 57.13 |
| 12 | 56.758 | 10.61 | | | 50.54 |
| 13 | −90.754 | 1.40 | 1.78800 | 47.4 | 49.68 |
| 14 | 60.346 | 6.37 | 1.95906 | 17.5 | 48.60 |
| 15 | 2822.205 | (variable) | | | 48.36 |
| 16 | −77.611 | 1.40 | 1.83400 | 37.2 | 38.61 |
| 17 | 76.868 | 4.27 | 1.92286 | 18.9 | 40.95 |
| 18* | 3094.419 | (variable) | | | 41.45 |
| 19 | 288.163 | 12.15 | 1.60311 | 60.6 | 82.43 |
| 20* | −129.586 | 0.50 | | | 83.25 |
| 21 | 88.724 | 15.26 | 1.49700 | 81.5 | 85.32 |
| 22 | −483.672 | 0.20 | | | 84.62 |
| 23 | 111.193 | 2.50 | 1.84666 | 23.8 | 79.68 |
| 24 | 57.537 | 19.13 | 1.43875 | 94.9 | 74.18 |
| 25 | −443.098 | 0.16 | | | 72.66 |
| 26* | 446.000 | 3.99 | 1.49700 | 81.5 | 70.88 |
| 27 | −1480.372 | (variable) | | | 69.82 |
| 28 (stop) | ∞ | 1.64 | | | 36.65 |
| 29 | −961.357 | 1.40 | 1.88300 | 40.8 | 35.59 |
| 30 | 54.169 | 4.35 | 1.80518 | 25.4 | 34.11 |
| 31 | −32540.640 | 4.59 | | | 33.58 |
| 32 | −68.810 | 1.85 | 1.81600 | 46.6 | 31.90 |
| 33 | 83.462 | 0.32 | | | 31.39 |
| 34 | 37.894 | 4.29 | 1.80809 | 22.8 | 31.70 |
| 35 | 143.041 | 3.78 | | | 31.14 |
| 36 | −150.325 | 1.58 | 1.88300 | 40.8 | 30.21 |
| 37 | 78.201 | 10.00 | | | 29.74 |
| 38 | −90.545 | 1.91 | 1.71736 | 29.5 | 30.52 |
| 39 | 97.481 | 14.91 | 1.65160 | 58.5 | 31.44 |
| 40 | −74.406 | 3.20 | | | 34.10 |
| 41 | −403.126 | 6.68 | 1.54814 | 45.8 | 34.44 |
| 42 | −56.456 | 3.12 | | | 34.77 |
| 43 | −257.236 | 3.07 | 1.88300 | 40.8 | 33.48 |
| 44 | 40.035 | 9.25 | 1.51742 | 52.4 | 33.00 |
| 45 | −64.123 | 0.20 | | | 33.48 |
| 46 | 1267.155 | 8.18 | 1.49700 | 81.5 | 33.31 |
| 47 | −30.062 | 2.50 | 1.83481 | 42.7 | 33.14 |
| 48 | −88.524 | 1.18 | | | 34.27 |
| 49 | 120.705 | 5.78 | 1.54814 | 45.8 | 34.39 |
| 50 | −51.632 | 14.45 | | | 34.26 |
| 51 | ∞ | 33.00 | 1.60859 | 46.4 | 60.00 |
| 52 | ∞ | 13.20 | 1.51633 | 64.2 | 60.00 |
| 53 | ∞ | 15.05 | | | 60.00 |
| image plane | ∞ | | | | |

Aspheric Surface Data

11th surface

K = 0.00000e+000   A4 = 4.75251e−007   A6 = 3.10090-011
A8 = −9.85937e−013   A10 = 1.36448e−015   A12 = −6.91934e−019

18th surface

K = 0.00000e+000   A4 = 4.04444e−007   A6 = 4.62610-010
A8 = −1.17218e−012   A10 = 1.72458e−015   A12 = −1.12858e−018

20th surface

K = −1.34149e+001   A4 = −5.55821e−007   A6 = 2.30199e−010
A8 = −7.33321e−014   A10 = 1.72749e−017   A12 = −2.05035e−021

26the surface

K = 1.15333e+002   A4 = −2.25415e−007   A6 = −1.06849e−010
A8 = −7.70580e−014   A10 = 8.17951e−017   A12 = −4.81179e−020

Various Data
Zoom ratio 120.00

| | Wide angle | Intermediate | Telephoto |
|---|---|---|---|
| Focal length | 9.00 | 100.00 | 1080.00 |
| F-number | 1.85 | 1.85 | 5.60 |
| Angle of view | 31.43 | 3.15 | 0.29 |
| Image height | 5.50 | 5.50 | 5.50 |
| Total lens length | 651.95 | 651.95 | 651.95 |
| BF | 15.05 | 15.05 | 15.05 |
| d10 | 2.78 | 151.02 | 192.71 |
| d15 | 53.98 | 12.08 | 5.00 |
| d18 | 230.13 | 98.26 | 1.98 |
| d27 | 3.00 | 28.53 | 90.20 |
| Entrance pupil position | 137.18 | 1014.67 | 11559.15 |
| Exit pupil position | 326.98 | 326.98 | 326.98 |
| Front principal point position | 146.44 | 1146.73 | 16378.42 |

Numerical Embodiment 5
Unit: mm

|  | Rear principal point position | 6.05 | −84.95 | −1064.95 |
|---|---|---|---|---|

Zoom Lens Unit Data

| Unit | Leading surface | Focal length | Lens structure length | Front principal point position | Rear principal point position |
|---|---|---|---|---|---|
| 1 | 1 | 257.79 | 112.41 | 64.51 | −18.88 |
| 2 | 11 | −40.33 | 20.58 | 3.67 | −11.57 |
| 3 | 16 | −101.22 | 5.67 | −0.00 | −2.97 |
| 4 | 19 | 65.57 | 53.89 | 11.49 | −26.02 |
| 5 | 28 | 54.09 | 154.45 | 66.09 | 28.96 |

Single Lens Data

| Lens | Leading surface | Focal length |
|---|---|---|
| 1 | 1 | −447.56 |
| 2 | 3 | 517.91 |
| 3 | 5 | 679.89 |
| 4 | 7 | 666.69 |
| 5 | 9 | 901.13 |
| 6 | 11 | −56.82 |
| 7 | 13 | −45.58 |
| 8 | 14 | 63.38 |
| 9 | 16 | −45.82 |
| 10 | 17 | 84.31 |
| 11 | 19 | 149.27 |
| 12 | 21 | 151.75 |
| 13 | 23 | −142.51 |
| 14 | 24 | 117.14 |
| 15 | 26 | 688.08 |
| 16 | 29 | −57.70 |
| 17 | 30 | 66.55 |
| 18 | 32 | −45.73 |
| 19 | 34 | 62.00 |
| 20 | 36 | −57.73 |
| 21 | 38 | −64.64 |
| 22 | 39 | 66.79 |
| 23 | 41 | 118.34 |
| 24 | 43 | −38.82 |
| 25 | 44 | 48.90 |
| 26 | 46 | 59.04 |
| 27 | 47 | −55.30 |
| 28 | 49 | 66.42 |
| 29 | 51 | 0.00 |
| 30 | 52 | 0.00 |

Numerical Embodiment 6
Unit: mm

Surface Data

| Surface Number (i) | r | d | nd | vd | Effective Diameter |
|---|---|---|---|---|---|
| 1 | 7000.000 | 6.00 | 1.83400 | 37.2 | 188.70 |
| 2 | 364.040 | 1.51 | | | 188.48 |
| 3 | 350.866 | 25.54 | 1.43387 | 95.1 | 189.44 |
| 4 | −519.819 | 25.35 | | | 189.92 |
| 5 | 490.733 | 17.92 | 1.43387 | 95.1 | 190.96 |
| 6 | −855.009 | 0.25 | | | 190.62 |
| 7 | 205.350 | 16.97 | 1.43387 | 95.1 | 183.83 |
| 8 | 543.579 | 1.20 | | | 182.45 |
| 9 | 197.656 | 12.82 | 1.49700 | 81.5 | 175.15 |
| 10 | 373.593 | (variable) | | | 173.43 |
| 11* | −1586.096 | 2.20 | 2.00330 | 28.3 | 52.04 |
| 12 | 47.555 | 10.91 | | | 45.77 |
| 13 | −68.039 | 1.40 | 1.88300 | 40.8 | 45.22 |
| 14 | 57.622 | 7.73 | 1.95906 | 17.5 | 46.20 |
| 15 | −163.533 | (variable) | | | 46.27 |
| 16 | −85.736 | 1.70 | 1.43875 | 94.9 | 40.00 |
| 17 | −3294.065 | (variable) | | | 41.60 |
| 18 | 395.258 | 10.66 | 1.60311 | 60.6 | 71.10 |
| 19* | −132.287 | 0.50 | | | 72.33 |
| 20 | 85.476 | 12.68 | 1.59201 | 67.0 | 74.51 |
| 21 | −464.841 | 0.20 | | | 73.83 |
| 22 | 116.971 | 2.50 | 1.84666 | 23.8 | 70.15 |
| 23 | 53.812 | 15.49 | 1.43875 | 94.9 | 65.46 |
| 24 | 6560.382 | 0.95 | | | 64.00 |
| 25* | 308.808 | 4.92 | 1.60311 | 60.6 | 62.88 |
| 26 | −1604.987 | (variable) | | | 61.77 |
| 27 (stop) | ∞ | 0.85 | | | 34.64 |
| 28 | 235.250 | 1.40 | 1.88300 | 40.8 | 33.75 |
| 29 | 80.496 | 3.57 | 1.92286 | 18.9 | 32.78 |
| 30 | 836.152 | 5.34 | | | 31.99 |
| 31 | −84.028 | 1.85 | 1.81600 | 46.6 | 29.06 |
| 32 | 73.063 | 0.19 | | | 28.08 |
| 33 | 26.566 | 2.68 | 1.80809 | 22.8 | 27.87 |
| 34 | 31.528 | 5.90 | | | 26.87 |
| 35 | −115.361 | 1.58 | 1.88300 | 40.8 | 26.26 |
| 36 | 153.852 | 31.99 | | | 26.14 |
| 37 | −258.335 | 3.07 | 1.83400 | 37.2 | 28.39 |
| 38 | 29.722 | 8.36 | 1.51742 | 52.4 | 29.04 |
| 39 | −38.281 | 0.20 | | | 29.62 |
| 40 | 157.674 | 6.69 | 1.43875 | 94.9 | 30.14 |
| 41 | −27.270 | 2.50 | 1.88300 | 40.8 | 30.18 |
| 42 | −67.370 | 1.18 | | | 31.86 |
| 43 | 112.278 | 6.90 | 1.54814 | 45.8 | 32.67 |
| 44 | −37.696 | 14.45 | | | 32.70 |
| 45 | ∞ | 33.00 | 1.60859 | 46.4 | 60.00 |
| 46 | ∞ | 13.20 | 1.51633 | 64.2 | 60.00 |
| 47 | ∞ | 11.38 | | | 60.00 |
| image plane | ∞ | | | | |

Aspheric Surface Data

11th surface

K = 0.00000e+000  A4 = 4.37115−007  A6 = 1.06216e−010
A8 = −8.78096e−013  A10 = 1.67797e−015  A12 = −1.10768e−018

19th surface

K = −1.29980e+001  A4 = −4.39306e−007  A6 = 1.81695e−010
A8 = −8.89472e−014  A10 = 4.73968e−017  A12 = −1.13684e−020

25th surface

K = 1.73345e+001  A4 = −2.24032e−008  A6 = −1.62677e−010
A8 = −3.43521e−014  A10 = 9.97369e−017  A12 = −4.51601e−020

Various Data
Zoom ratio 70.00

|  | Wide angle | Intermediate | Telephoto |
|---|---|---|---|
| Focal length | 9.30 | 80.00 | 651.00 |
| F-number | 1.85 | 1.85 | 3.45 |
| Angle of view | 30.60 | 3.93 | 0.48 |
| Image height | 5.50 | 5.50 | 5.50 |
| Total lens length | 608.09 | 608.09 | 608.09 |
| BF | 11.38 | 11.38 | 11.38 |
| d10 | 2.96 | 139.03 | 191.62 |
| d15 | 91.94 | 23.15 | 29.46 |
| d17 | 174.48 | 82.58 | 2.21 |
| d26 | 3.00 | 27.63 | 49.10 |
| Entrance pupil position | 131.23 | 799.77 | 6236.46 |
| Exit pupil position | 130.04 | 130.04 | 130.04 |
| Front principal point position | 141.25 | 933.70 | 10459.13 |
| Rear principal point position | 2.08 | −68.61 | −639.62 |

Numerical Embodiment 6
Unit: mm

Zoom Lens Unit Data

| Unit | Leading surface | Focal length | Lens structure length | Front principal point position | Rear principal point position |
|---|---|---|---|---|---|
| 1 | 1 | 256.08 | 107.56 | 60.40 | −19.70 |
| 2 | 11 | −35.86 | 22.24 | 2.12 | −14.71 |
| 3 | 16 | −200.16 | 1.70 | −0.03 | −1.21 |
| 4 | 18 | 64.70 | 47.90 | 9.40 | −23.02 |
| 5 | 27 | 40.51 | 144.91 | 62.65 | 15.38 |

Single Lens Data

| Lens | Leading surface | Focal length |
|---|---|---|
| 1 | 1 | −457.71 |
| 2 | 3 | 485.92 |
| 3 | 5 | 719.72 |
| 4 | 7 | 747.38 |
| 5 | 9 | 822.09 |
| 6 | 11 | −45.61 |
| 7 | 13 | −34.95 |
| 8 | 14 | 44.61 |
| 9 | 16 | −200.16 |
| 10 | 18 | 164.95 |
| 11 | 20 | 122.58 |
| 12 | 22 | −118.72 |
| 13 | 23 | 123.26 |
| 14 | 25 | 428.14 |
| 15 | 28 | −138.37 |
| 16 | 29 | 95.12 |
| 17 | 31 | −47.40 |
| 18 | 33 | 166.37 |
| 19 | 35 | −74.03 |
| 20 | 37 | −31.60 |
| 21 | 38 | 33.60 |
| 22 | 40 | 53.45 |
| 23 | 41 | −53.14 |
| 24 | 43 | 52.07 |
| 25 | 45 | 0.00 |
| 26 | 46 | 0.00 |

TABLE 1

|  |  | Emb. 1 | Emb. 2 | Emb. 3 | Emb. 4 | Emb. 5 | Emb. 6 |
|---|---|---|---|---|---|---|---|
|  | Z | 125.00 | 100.00 | 80.00 | 90.00 | 120.00 | 70.00 |
|  | fw | 8.70 | 8.50 | 8.40 | 9.30 | 9.00 | 9.30 |
|  | z1a magnification | 1.43 | 1.34 | 1.39 | 1.25 | 1.37 | 1.54 |
|  | z2a magnification | 21.87 | 32.80 | 33.57 | 27.19 | 20.82 | 27.74 |
|  | L2z1a | 1.55 | 1.74 | 1.44 | 2.05 | 21.67 | 0.10 |
|  | L2z2a | 2.26 | 2.60 | 8.77 | 2.28 | 4.76 | 0.14 |
|  | f1 | 257.85 | 256.66 | 247.75 | 260.54 | 257.81 | 256.08 |
|  | f2 | −37.79 | −35.27 | −33.56 | −37.94 | −40.40 | −35.86 |
|  | f3 | −102.17 | −135.95 | −170.09 | −142.56 | −101.05 | −200.16 |
|  | f4 | 63.84 | 64.68 | 64.40 | 64.49 | 65.51 | 64.70 |
|  | L2w | 38.24 | 31.10 | 37.52 | 23.00 | 53.99 | 91.94 |
|  | L2t | 20.75 | 30.00 | 39.64 | 15.01 | 4.99 | 29.46 |
|  | L3w | 247.59 | 250.12 | 231.52 | 257.10 | 230.12 | 174.48 |
|  | f23w | −20.11 | −22.31 | −22.48 | −24.85 | −19.71 | −20.95 |
|  | β4W | −0.26 | −0.26 | −0.27 | −0.25 | −0.28 | −0.31 |
|  | β4T | −1.33 | −1.11 | −0.91 | −1.32 | −1.61 | −1.03 |
| Conditional Expression (1) | L2w/L2z1a | 24.65 | 17.83 | 26.03 | 11.21 | 2.49 | 919.44 |
| Conditional Expression (2) | L2w/L3w | 0.15 | 0.12 | 0.16 | 0.09 | 0.23 | 0.53 |
| Conditional Expression (3) | f1/f23w | −12.82 | −11.50 | −11.02 | −10.48 | −13.08 | −12.22 |
| Conditional Expression (4) | L2w/L2t | 1.84 | 1.04 | 0.95 | 1.53 | 10.82 | 3.12 |
| Conditional Expression (5) | L2w/L2z2a | 16.93 | 11.98 | 4.28 | 10.10 | 11.33 | 675.07 |
| Conditional Expression (6) | L2w/f2 | −1.01 | −0.88 | −1.12 | −0.61 | −1.34 | −2.56 |
| Conditional Expression (7) | f2/f3 | 0.37 | 0.26 | 0.20 | 0.27 | 0.40 | 0.18 |
| Conditional Expression (8) | f1/f4 | 4.04 | 3.97 | 3.85 | 4.04 | 3.94 | 3.96 |
| Conditional Expression (9) | β4t/β4w | 5.15 | 4.31 | 3.40 | 5.25 | 5.72 | 3.27 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-090964, filed Apr. 15, 2011, which is hereby incorporated by reference herein in its entirety.

What is claimed is:

1. A zoom lens comprising, in order from an object side to an image side:
   a first lens unit having a positive refractive power that does not move for zooming;
   a second lens unit having a negative refractive power that moves during zooming;
   a third lens unit having a negative refractive power that moves during zooming;
   a fourth lens unit having a positive refractive power that moves during zooming; and
   a fifth lens unit having a positive refractive power that does not move for zooming,
   wherein the zoom lens satisfies the following conditional expressions, $1.50 < L2w/L2z1a < 1600.00$, $0.05 < L2w/L3w < 0.60$, and $-14.50 < f1/f23w < -10.00$, where $L2w$ denotes an air interval between the second lens unit and the third lens unit at a wide-angle end, $L3w$ denotes an air interval between the third lens unit and the fourth lens unit at the wide-angle end, $f1$ denotes a focal length of the first lens unit, $f23w$ denotes a combined focal length of the second lens unit and the third lens unit at the wide-angle end, $Z$ denotes a zoom ratio, and $L2z1a$ denotes a smallest value of the air interval between the second lens unit and the third lens unit in a zoom range in which a magnification-varying ratio relative to that at the wide-angle end ranges from $Z^{0.02}$ to $Z^{0.35}$.

2. A zoom lens according to claim 1, wherein the zoom lens satisfies the following conditional expression:

$0.85 < L2w/L2t < 11.50$, where $L2t$ denotes a air interval between the second lens unit and the third lens unit at a telephoto end.

3. A zoom lens according to claim 1, wherein the zoom lens satisfies the following conditional expression:

$1.50 < L2w/L2z2a < 1000.00$, where $L2z2a$ denotes a smallest value of the air interval between the second lens unit and the third lens unit in a telephoto zoom range in which a focal length $fz2$ of the whole system satisfies the following conditional expression:

$fw \cdot Z^{0.55} < fz2 \leq fw \cdot Z^{0.85}$, where $fw$ denotes a focal length of the whole system at the wide-angle end.

4. A zoom lens according to claim 1, wherein the zoom lens satisfies the following conditional expression:

$-3.00 < L2w/f2 < -0.50$, where $f2$ denotes a focal length of the second lens unit.

5. A zoom lens according to claim 1, wherein the zoom lens satisfies the following conditional expression:

$0.15 < f2/f3 < 0.50$, where $f2$ denotes a focal length of the second lens unit, and $f3$ denotes a focal length of the third lens unit.

6. A zoom lens according to claim 1, wherein the zoom lens satisfies the following conditional expression:

$3.50 < f1/f4 < 4.50$, where $f4$ denotes a focal length of the fourth lens unit.

7. A zoom lens according to claim 1, wherein the zoom lens satisfies the following conditional expression:

$2.00 < \beta 4t/\beta 4w < 7.00$, where $\beta 4w$ denotes a lateral magnification of the fourth lens unit at the wide-angle end, and $\beta 4t$ denotes a lateral magnification of the fourth lens unit at a telephoto end.

8. An image pickup apparatus comprising:
   a zoom lens including, in order from an object side to an image side:
   a first lens unit having a positive refractive power that does not move for zooming;
   a second lens unit having a negative refractive power that moves during zooming;
   a third lens unit having a negative refractive power that moves during zooming;
   a fourth lens unit having a positive refractive power that moves during zooming; and
   a fifth lens unit having a positive refractive power that does not move for zooming,
   wherein the zoom lens satisfies the following conditional expressions, $1.50 < L2w/L2z1a < 1600.00$, $0.05 < L2w/L3w < 0.60$, and $-14.50 < f1/f23w < -10.00$, where $L2w$ denotes an air interval between the second lens unit and the third lens unit at a wide-angle end, $L3w$ denotes an air interval between the third lens unit and the fourth lens unit at the wide-angle end, $f1$ denotes a focal length of the first lens unit, $f23w$ denotes a combined focal length of the second lens unit and the third lens unit at the wide-angle end, $Z$ denotes a zoom ratio, and $L2z1a$ denotes a smallest value of the air interval between the second lens unit and the third lens unit in a zoom range in which a magnification-varying ratio relative to that at the wide-angle end ranges from $Z^{0.02}$ to $Z^{0.35}$; and
   a solid state image pickup element that receives an image formed by the zoom lens.

* * * * *